United States Patent
Lim

(10) Patent No.: US 9,313,182 B2
(45) Date of Patent: *Apr. 12, 2016

(54) PROTECTING INFORMATION USING POLICIES AND ENCRYPTION

(71) Applicant: NextLabs, Inc., San Mateo, CA (US)

(72) Inventor: Keng Lim, Atherton, CA (US)

(73) Assignee: NextLabs, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/494,525

(22) Filed: Sep. 23, 2014

(65) Prior Publication Data

US 2015/0012741 A1 Jan. 8, 2015

Related U.S. Application Data

(63) Continuation of application No. 13/439,827, filed on Apr. 4, 2012, now Pat. No. 8,843,734.

(60) Provisional application No. 61/471,682, filed on Apr. 4, 2011.

(51) Int. Cl.
| | |
|---|---|
| G06F 21/00 | (2013.01) |
| H04L 29/06 | (2006.01) |
| H04L 9/00 | (2006.01) |
| H04L 12/58 | (2006.01) |
| G06F 21/60 | (2013.01) |

(52) U.S. Cl.
CPC .......... *H04L 63/0471* (2013.01); *G06F 21/602* (2013.01); *H04L 9/00* (2013.01); *H04L 51/08* (2013.01); *G06F 21/00* (2013.01); *G06F 21/60* (2013.01); *H04L 63/0245* (2013.01); *H04L 63/12* (2013.01); *H04L 63/20* (2013.01)

(58) Field of Classification Search
CPC .......... H04L 9/00; H04L 63/20; H04L 63/12; H04L 51/08; H04L 63/0254; H04L 63/0471; G06F 21/60; G06F 21/00; G06F 21/602
See application file for complete search history.

(56) References Cited

U.S. PATENT DOCUMENTS

| | | | |
|---|---|---|---|
| 7,810,027 B2 | 10/2010 | Bendik | |
| 8,918,867 B1 * | 12/2014 | Salour | G06F 11/00 726/22 |
| 2007/0162749 A1 | 7/2007 | Lim | |
| 2008/0002830 A1 | 1/2008 | Cherkasov et al. | |
| 2008/0060051 A1 | 3/2008 | Lim | |
| 2008/0162652 A1 * | 7/2008 | True | H04L 63/1408 709/206 |
| 2008/0294586 A1 * | 11/2008 | Lim | G06F 9/468 706/47 |

* cited by examiner

*Primary Examiner* — Fatoumata Traore
*Assistant Examiner* — Kendall Dolly
(74) *Attorney, Agent, or Firm* — Aka Chan LLP

(57) ABSTRACT

A technique and system protects documents at rest and in motion using declarative policies and encryption. Encryption in the system is provided transparently and can work in conjunction with policy enforcers installed at a system. A system can protect information or documents from: (i) insider theft; (ii) ensure confidentiality; and (iii) prevent data loss, while enabling collaboration both inside and outside of a company.

20 Claims, 11 Drawing Sheets

PROTECTING INFORMATION USING POLICIES AND ENCRYPTION

CROSS-REFERENCE TO RELATED APPLICATIONS

This patent application is a continuation of U.S. patent application Ser. No. 13/439,827, filed Apr. 4, 2012, issued as U.S. Pat. No. 8,843,734 on Sep. 23, 2014, which claims the benefit of U.S. provisional application 61/471,682, filed Apr. 4, 2011, which are incorporated by reference along with all other references cited in this application.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to the field of information or document management, and more specifically, to protecting documents at rest and in motion using declarative policies and encryption.

Computers have evolved to become repositories for information from all aspects of life, including society's personal and business matters. These vast stores of knowledge are easily accessible through a variety of convenient methods, such as through a network connection. But as reliance on computers has grown, so has the need to keep information, particularly sensitive information, out of the hands of those who may abuse it.

In the business realm, an information management system addresses this need to protect sensitive or high-value information. Some common business challenges that companies look to address are: (i) insider theft—protecting intellectual property from being stolen by personnel working within an organization (e.g., theft by employees, theft by contractors); (ii) external sharing—controlling intellectual property shared with partners or customers; (iii) confidentiality—preserving the confidentiality around sensitive or secret projects; and (iv) external collaboration—limiting third-party use of data.

While these business challenges may seem straight forward, there are many operational or functional challenges associated with implementing an information management system. Some of these operational and functional challenges include classifying information, handling of different data types, controlling access to information, controlling use of information, making information available to users, protecting information at-rest, in-transit and in-distribution, and managing policies and information being managed.

Therefore, there is a need for improved information management systems.

BRIEF SUMMARY OF THE INVENTION

A system allows enterprises to protect data after it leaves a server and protect data no matter where it goes. Using the system, companies can protect information or documents from: (i) insider theft; (ii) ensure confidentiality; and (iii) prevent data loss, while enabling collaboration both inside and outside of a company.

An information management system can be used to enforce secure access (or otherwise restrict access) to the information of the system. The information management system can be a client-server arrangement, where files are stored on servers and client devices have a policy enforcer program resident on them. Each policy enforcer program evaluates rules and determines whether access to a file is permitted or not.

Rules for the system can be managed at the server level, and then subsets deployed at the clients for evaluation by policy enforcer programs at each of the clients. A subset of the rules are stored at each client. The subset of rules at each client can be periodically refreshed, so that changes at the server level are propagated to each client.

In an implementation, information of the system, such as files and documents, are stored in an unencrypted format. When unencrypted, despite the policy enforcers restricting access, the information can still be viewed by using appropriate techniques. For example, when the information is transmitted across a wire, a sniffer device can capture the bits being transmitted. A hard disk with unencrypted information and be removed and connected to a computer without a policy enforcer program. Then the information, which was previously restricted, can be accessed without any restrictions.

In an implementation, information of the system is stored in an encrypted format. The data encryption and decryption are transparent to the user. At each client, in addition to the policy enforcer program, there is an encryption module, which handles encryption and decryption of the data. The system operates similarly as in the unencrypted system. However, after a policy enforcer allows access, the encryption module traps any information retrieval operation. When the information is encrypted, the encryption module handles decrypting the data.

To decrypt the data, the encryption module requests a key from the policy enforcer program. To support its request, the encryption module provides trust information including a process identifier (e.g., MS Word process), file path, and user to the policy enforcer. With this trust information, the policy enforcer program can compare information about to previously allowed processes and determine whether to send key to the encryption module. If the information is not correct, the correct key is not sent, and the encryption module will not be able to unencrypt the information properly.

If the trust information from the encryption module is correct, the policy enforcer program can send the key to the encryption module. The key can be stored locally on the device or may be a shared key, which is also stored at the server level. For example, the policy enforcer program can request the key from a key server of the information management system.

In an implementation, a method includes: providing a document management system managing at least two documents where the document management system includes clients and servers; at a first client, executing a first policy enforcer program; at the first client, trapping by the first policy enforcer program a request by an e-mail application to send an e-mail with a document attachment, managed by the document management system, to a second client; at the first policy enforcer program, evaluating at least one policy associated with document attachment; as a result of the evaluating, determining that the send request is allowed, but before allowing to e-mail application to send the document attachment, encrypting the document attachment; and allowing to e-mail application to send the encrypted document attachment to the second client. The document attachment can be unencrypted. The at least one policy associated with document attachment can be stored at the first client. The document attachment is encrypted by an encryption module executing on the first client, the encryption module is separate from the policy enforcer program.

In an implementation, a method includes: receiving an encrypted document attachment at a second client; detecting an attempt to open the encrypted document attachment at the second client at a second policy enforcer program at the second client; at the second policy enforcer program, evaluating at least one policy associated with encrypted document attachment; as a result of the evaluating, determining that the open operation is allowed; at an encryption module executing on the second client, determining the encrypted document attachment is encrypted; at an encryption module, attempting to obtain a key for the encrypted document attachment by sending a key request to the second policy enforcer program including information comprising a process identifier; at the second policy enforcer program, receiving the key request from the encryption module and evaluating the request based on the information comprising a process identifier; when the process identifier matches a previously saved process identifier, at the second policy enforcer program, sending a request to a key server of the document management system; after receiving a key from the key server at the second client, passing the key to the encryption module; and at the encryption module, using the received key in unencrypting of the encrypted document attachment to obtain the unencrypted document attachment.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
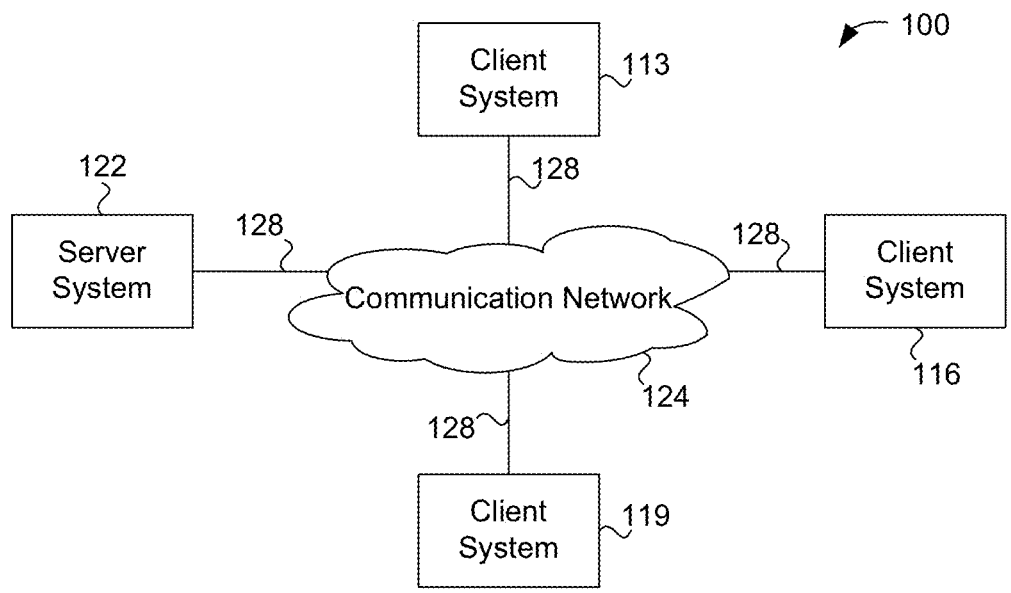
FIG. 1 shows a simplified block diagram of a distributed computer network and clients.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, and others.

Figure 2:
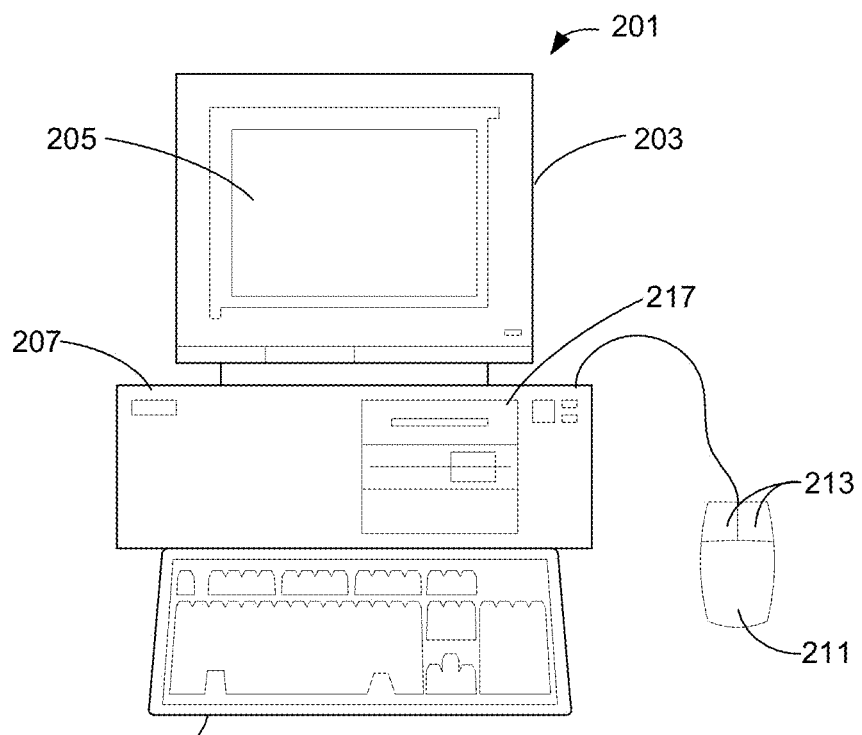
FIG. 2 shows a more detailed diagram of a computer system which may be a client or server.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
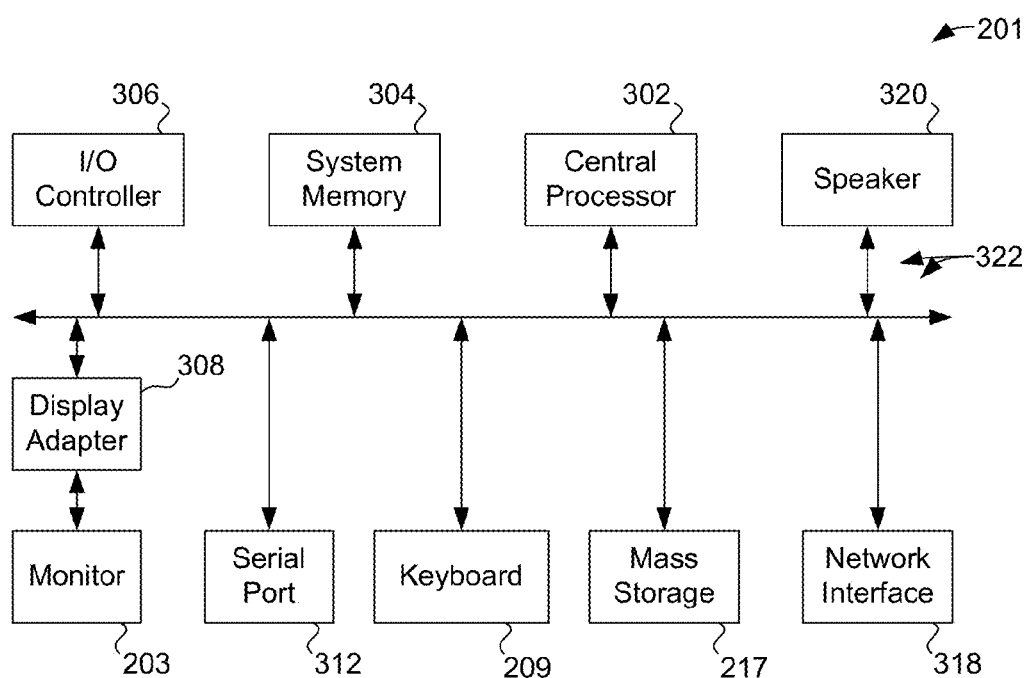
FIG. 3 shows a system block diagram of computer system.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, or Microsoft Xbox 360 central processing unit (CPU).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). An operating system for the system may be one of the Microsoft Windows® family of operating systems (e.g., Windows 95, 98, Me, Windows NT, Windows 2000, Windows XP, Windows Vista, Windows 7, Windows CE, Windows Mobile), Linux, UNIX, Sun OS, Ubuntu, or Macintosh OS X. Other operating systems may be used. Microsoft Windows is a trademark of Microsoft Corporation.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Information Management System

An information management system employs a plurality of policies, a plurality of data protection clients and a plurality of encryption service modules to provide protection to information or documents. Information includes data in a relational database, in an enterprise resource planning (or "ERP") system, in a product lifecycle management (or "PLM") system, in a collaboration system such as Microsoft SharePoint®, on a Web server, and more. A document may exist in the form of a file on a file system, an attachment of an e-mail message, a file in an archive such as a zip file or Adobe Portfolio®, and more.

U.S. provisional applications 60/755,019, filed Dec. 29, 2005, 61/357,016, filed Jun. 21, 2010, and 61/368,408, filed Jul. 28, 2010, and U.S. patent application Ser. No. 11/383,159, filed May 12, 2006, Ser. No. 11/383,161, filed May 12, 2006, and Ser. No. 11/383,164, filed May 12, 2006, and Ser. No. 11/615,477, filed Dec. 22, 2006, are also incorporated by reference.

The plurality of policies that is used to control access to and use of information or documents may be defined independent of users, information, or documents. As such, a policy may be defined before a user who is affected by the policy is added to an information management system. Similarly, a policy may be defined before information or a document is created and access to the information or document is controlled by an information management system.

Controlling access to information or documents includes allowing or denying the opening a file, renaming a file, deleting a file, opening a Web page, opening a document listing screen of a SAP client, and more. Controlling use of information or documents includes allowing or denying the copying content of a document, printing of a document, saving a document into a different file, copying a file, attaching a file to an email message, adding a file to an archive such as a zip file, embedded a file into a document, merging two documents, sending an email message to a recipient, uploading a file to a Web site, and more.

The plurality of policies is stored in a policy server. Either the plurality of polices or a subset of the plurality of policies may be distributed to a data protection client from a policy server.

The plurality of data protection clients control access to and use of information or documents by attaching to (or instrumenting) application programs that are used to access information or documents to intercept application program operations. When a data protection intercepts and application program operation, it sends the operation along with information relevant to the operation to a policy engine to perform policy evaluation. For an access or usage policy, a decision from policy evaluation includes allow or deny. In addition to policy decision, policy evaluation may return a policy obligation, optionally.

Examples of an application program includes a word processor (e.g., Microsoft Word®, or Apple iWork Pages®), spreadsheet (e.g., Microsoft Excel® or Apple iWork Numbers®), presentation program (e.g., Microsoft PowerPoint®, Apple Keynote®), document viewer (e.g., Adobe Reader®), Web browser (e.g., Microsoft Internet Explorer®, Mozilla Mozilla Firefox® or Apple Safari®), email client (e.g., Microsoft Outlook®), instant messenger (e.g., Microsoft Office Communicator® or Skype®), and more.

Examples of application program operations includes opening a file, copy a file, moving a file, renaming a file, deleting a file, printing a document, copying content of a document, changing document classification, saving a document into a different file, uploading a file to a Web site, opening a Web page, showing a data page of an application (e.g., a component listing on a SAP client), sending an email message, attaching a file to an email, sending a message through instant messenger, inviting a user to join a video conference, capturing a screen image, and more.

In additional to controlling access and usage of information or documents, a data protection client also controls access to encryption keys used by an encryption service module to encrypt and decrypt information or documents.

The plurality of encryption service modules performs encryption and decryption on information or documents independent of application programs whereby encryption and decryption are transparent to the application programs.

An encryption service module does not perform access control decision or enforcement on information or documents. All access control decisions and enforcement on information or documents are performed by a data protection client.

Besides providing transparent encryption and decryption services, the plurality of encryption service modules also performs encryption key switching (also referred to as "key switching" in this document) on encrypted information or documents. Key switching is needed when access requirement to a particular encrypted information or document changes. For example, if a document is encrypted with encryption key A which is available only to a particular computing device and the document is being sent to recipient X who does not have access to the computing device, the document needs to be decrypted using encryption key A and re-encrypted with encryption key B which recipient X has access to. The process of decrypting particular information or document with a first encryption key and re-encrypting the particular information or document with a second encryption key is referred to as key switching in this document.

Key switching may be used to make encrypted information or documents sharable among one or more users, or inversely not shared with any user. Key switching is also needed when encrypted information or documents shared among a first group of users needs to be shared with a second group of users. By switching from a first encryption key that is used to encrypt the information or documents to a second encryption key that is accessible by the second group of users, the information or documents becomes accessible by the second group of users after key switching is performed.

Data Protection Client

In an embodiment, a data protection client instruments an application program, intercepts an operation of the application program, evaluates a subset of policies according to the operation, information or a document being accessed (e.g., opening of file) or used (e.g., copy content of a document), and a user or user account operating the application program, enforces a decision (or an "effect") from policy evaluation, and can implement zero or more policy obligations according to the subset of policies.

A data protection client may instrument an application program using at least one of application plug-in, code injection, operating system management interface, operating system service provider, device driver, or any combination thereof. An example of an application plug-in includes Microsoft Word® add-in, Microsoft Excel® add-in, Microsoft PowerPoint® add-in, Microsoft Outlook® add-in, Microsoft Internet Explorer® add-in, Microsoft Windows Explorer® add-in, Adobe Reader® plug-in, Adobe Acrobat® plug-in, and more. An example of an operating system service provider is Microsoft WinSock Service Provider®.

An operation of an application program (also referred to as "application program operation" in this document) includes an event or a notification generated in the application program, or a function invoked in the application program. An example of an application program operation includes opening of a file, copying content of a document, and more.

For policy decision, an access or usage control policy decision is one of allow or deny. Policy decision for a monitoring policy is always allow. Other types of policies may support a different set of policy decisions. An example of enforcing an access policy decision includes allowing the opening a file, denying the opening a file, allowing the opening of a Web page, denying the display of a document list on a SAP client, and more. An example of enforcing an usage policy decision includes denying the copying content of a document, denying the sending an email message with a document attached, and more.

A policy obligation is a task to be performed by a data protection client when a policy specifying the policy obligation is in the subset of policies being evaluated and invocation condition of the policy obligation is satisfied. A policy obligation is an optional element of a policy. A policy evaluation may not produce a policy obligation. An example of a policy obligation includes a log obligation that logs data to a central log server, an automatic tagging obligation that inserts one or more document attributes into a document, an interactive tagging obligation that queries a user to enter one or more document attributes and inserts the one or more document attributes into a document, a strip attachment obligation that removes an attachment from an email message, and more.

A data protection client describes in this document implement functions of a policy enforcement point such as in U.S. patent application Ser. Nos. 11/383,159, 11/383,161, and 11/383,164, filed May 12, 2006, and Ser. No. 11/615,477, filed Dec. 22, 2006. A data protection client may also implement function of a policy decision point described in the same references.

The role of a data protection client is to protect sensitive or high-value information or documents from unauthorized access or misuse. The types of information or documents a data protection client needs to protect and the environment it needs to operate under affects the implementation of a data protection client. For example, to protect a wide range of information or documents accessible from a desktop or laptop computer, a policy enforcer may be deployed. A policy enforcer is a module or other computer code, executing on a computer, that is used to protect information by controlling access to the information. Some examples of operations a policy enforcer controls are whether to allow: open operations (e.g., whether a user can open a document file with Microsoft Word), edit operation (e.g., whether a user can copy from one document into another document, whether a user can modify an e-mail's text), and many others. An example of a policy enforcer that can be used with this system is described in U.S. patent application Ser. No. 13/193,588, filed Jul. 28, 2011, and Ser. No. 11/615,477, filed Dec. 22, 2006, which are incorporated by reference.

On the other hand, if the objective is to protect copying of high-value information or documents of a Microsoft Office® document or Adobe PDF® document, a lightweight enforcer described below may be deployed. In the case where sensitive information or documents are accessed only from a Web browser and the users are outside of an organization, an on-demand enforcer described below may be employed. Further, if the objective is to distribute information or documents to users outside of an organization, a rights managed container described below may be employed. In additional to employing a data protection client described here, an encryption service module may be employed to protect data at rest or in distribution. More details on data-at-rest and data-in-distribution are described further below in this document.

Lightweight Enforcer

In another implementation, a data protection client is a lightweight enforcer. A lightweight enforcer is simple to deploy and it may be deployed without an installation step. A lightweight enforcer is designed to provide targeted data protection functionalities. An example of targeted data protection functionalities is controlling access to and use of Microsoft Office® documents while a document is opened with or in Microsoft Word®, Microsoft Excel® or Microsoft PowerPoint®. Another example of targeted data protection functionalities is to prevent a user from saving sensitive or high-value information or documents to local disk or enforcing encryption of such information or documents before it is saved to local disk. Another example of targeted data protection functionalities is to audit all information or documents access by a user and save audit log data on local host or to a remote server.

Since a lightweight enforcer is simple to deploy, it may be deployed on an unmanaged computing devices (i.e. computing devices not managed by an information management system) use to access protected information or documents. When deployed on an unmanaged computing device, a lightweight enforcer may deny access to information or documents managed by the information management system by default. A user is allowed access to information or a document only if it is explicitly allowed by a policy. The exclude-by-default function may be implemented using one or more policies or by configuration to a lightweight enforcer.

A lightweight enforcer communicates with a policy server periodically. A lightweight enforcer obtains policies relevant to the lightweight enforcer from a policy server. A lightweight enforcer also communicates with a log server (or a "report server") and sends audit log data to the log server.

To enforce policies on a computing device, a lightweight enforcer instruments an application program on the computing device, intercepts an operation of the application program, effects policy evaluation on the operation, implementing a decision from policy evaluation, and optionally invokes a policy obligation.

To provide persistent protection to information or documents or protect information or documents in-transit or in-distribution, an encryption service module may be employed. When an encryption service module is deployed on a computing device with a lightweight enforcer, the lightweight enforcer will provide encryption key management service to an encryption service module. The encryption key management service includes encryption key generation, encryption key lookup with an encryption key management server, encryption key caching, encryption key expiration, and more.

On-Demand Enforcer

In another implementation, a data protection client is an on-demand enforcer. An on-demand enforcer may be a client application program, application program plug-in (e.g., a Microsoft Internet Explorer add-in) or application extension (e.g., a Web browser toolbar) that is downloaded to a computer device and run in a Web browser process. Since an on-demand enforcer runs in a Web browser process, it may only enforce policies applicable to a Web browser. Example use control policies for Web browser includes denying the copying of content of sensitive information or a document opened in a Web browser, denying saving of a high-value document opened in a Web browser, placing a security overlay on information or a document opened in a Web browser, and more. A security overlay is a security measure similar to print watermark that is overlay on top of content. Security overlay is a policy obligation.

An on-demand enforcer may be installed on an unmanaged computing device to enable access to information or documents protected by an information management system. Typically, a user downloads an on-demand enforcer when the user needs to access information of a document protected by the information management system. After an on-demand enforcer is downloaded, it is installed into one or more Web browser on a computing device. To enforce policies on a Web browser, an on-demand enforcer instruments the Web browser, intercepts an operation of the Web browser, effects policy evaluation on the operation, implementing a decision from policy evaluation, and optionally invokes a policy obligation.

An on-demand enforcer may deny access to information or documents managed by the information management system by default. In this case, a user is allowed access to information or a document only if it is explicitly allowed by a policy. The exclude-by-default function may be implemented using one or more policies or by configuration to an on-demand enforcer.

An on-demand enforcer may be packaged with a pre-defined set of policies and user identities. An on-demand enforcer may also communicate with a policy server periodically to obtain updated policies and user identities. An on-demand enforcer may also communicate with a log server and send audit log data to the log server.

To provide persistent protection to information or documents or protect information or documents in-transit or in-distribution, an encryption service module may be employed. When an encryption service module is deployed with an on-demand enforcer, the on-demand enforcer provides encryption key management service to the encryption service module. The encryption key management service includes encryption key generation, encryption key lookup with an encryption key management server, encryption key caching, encryption key expiration, and more.

Rights Managed Container

In another implementation, a data protection client is a rights managed container. A rights managed container is an executable information or document archive (also referred to as "executable archive") with built-in data protection client and encryption service module. In other words, a rights managed container comprises a data protection client, an encryption service module and a plurality of encrypted information or documents. Examples of an executable archive include an executable (.exe) file on Windows® operating system, an executable binary file on Apple OS/X® or Linux® operating system, and more.

To view information or documents in a rights managed container, a user invokes an executable archive using a method for starting an application program on an operating system of a computing device. The executable archive starts by acquiring the identity of a user attempting to access the information or documents in the executable archive. The executable archive may obtain a user's identify by querying the operating system it is running on, or it may query the user to login. Once the user is authenticate, the executable archive presents one or more lists of information or documents to the user. The executable archive may filter out information or documents the user is not allowed to access, optionally. The user may select particular information or document in a list for viewing. The executable archive invokes an application program installed on the computing device to display the particular information or open the particular document. A policy enforcement client in the executable archive instruments the application program to control usage of the particular information or document. The policy enforcement client establishes trust with the application program whereby allowing encryption key to be provided to an encryption service module on behave of the application program. Since the particular information or document in the executable archive is encrypted, an encryption service module in the executable archive is invoked to decrypt the information or document whereas providing a transparent decryption service to the application program.

Implementations of a data protection client are not limited to those described above. These implementations are only meant to be illustrative of examples of data protection clients that can be used by the system.

Roles of Encryption Service Module

An encryption service module is an add-on to a data protection client. An encryption service module provides transparent encryption and decryption services to application programs and encryption key switching to data protection client. An encryption service module it does not perform access or use control on information or documents. It also does not manage encryption keys.

The transparent encryption and decryption services are operating system services as such transparent encryption and decryption services do not run in an application program process space. Unlike application program-based encryption solution (e.g., Adobe Reader®, Microsoft Word®, or Microsoft Excel®) where decrypted data is provided only to an application program, transparent encryption and decryption services encrypt and decrypt data for all trusted application programs on a computing device. In addition, transparent encryption and decryption services are file format agnostics. Files of any format may be encrypted into a portable encrypted file. On the contrary, many application program-based encryption solutions (e.g., Adobe Reader®, Microsoft Word®, or Microsoft Excel®) has file format dependency. Further, application program-based encryption solutions provides limited use control (e.g., Adobe Reader® cannot protect screen capture) and it cannot protect content copied outside of the application program.

While different from application program-based encryption solution, transparent encryption and decryption services shares some common features with encrypted file system (e.g., Microsoft NTFS). Both transparent encryption and decryption services and encrypted file system operate as operating system services. Both transparent encryption and decryption services and encrypted file system are transparent to application programs. However, while transparent encryption and decryption services allow an encrypted file to be shared with other users, a file encrypted using NTFS® implementation of encrypted file system allows only the user who encrypt the file or a recovery agent to access the encrypted file. Transparent encryption and decryption services allow copying a file from a first file system to a second file system without decrypting content of the file. On the other hand, NTFS® implementation of encrypted file system decrypts content of an encrypted file when the encrypted file is copied from a NTFS® file system to a Microsoft FAT® file system. Also, when an encrypted file on NTFS file system is attached to an email message, the attached file is decrypted. Transparent encryption and decryption services attached an encrypted file to an email message.

A data protection client releases an encryption key to encryption service modules only if the application program that accesses particular encrypted information or a document is deemed trusted. To establish trust on an application program, a data protection client requires that an application program be instrumented by the data protection client and the data protection client has intercepted an open operation on particular encrypted information or document by a particular user within a period of time and the data protection client has decided to allow the application program to open the particular encrypted information or document. When an application program is entrusted to access particular encrypted information or document, it is referred to as a trusted application program for the particular encrypted information or document. While an application program may be trusted by a data protection client to access particular information or document, it may not be trusted to access another information or document.

A data protection client may keep trusted process information for a period of time. As a result, an application program instance may access unencrypted data during the period of time.

To ensure data is protected while unencrypted, an encryption service module only provides decrypted data of particular information or document to an application program instance that is trusted by a data protection client. Before an encryption service module encrypts or decrypts particular information or document, it requests an encryption key for the particular information or document from a data protection client providing at least an encryption key identifier and a process identifier of the application program instance that attempts to access the particular information or document in the request. The data protection client returns the encryption key associates with the key identifier if the application program instance is trusted.

In an implementation, an encryption service module uses an open-cipher based encryption algorithm such as advanced encryption standard (AES), data encryption standard (DES), skipjack, blowfish, or other ciphers. The module is used to encrypt information or documents and data encryption key. In other implementations, an encryption service module uses proprietary ciphers.

Transparent Decryption

In an embodiment, an encryption service module intercepts a read operation of an application program instance on a file on a file system. If an encryption flag on the file is set, the encryption service module obtains an encryption key matching the encryption key identifier associated with the file to decrypt data requested by the read operation. The decrypted data is returned in the read operation of the application program instance. In effect, decryption is transparent to the application program instance. The application program instance operates while unaware of the file is being encrypted, and a decryption operation is performed by the encryption service module to service its read operation.

If an encryption flag on the file is not set, the encryption service module treats the read operation as a pass-through and allows the native read operation to execute to completion. A native read operation is a read operation executed by an application program when an encryption service module is not installed.

To obtain an encryption key matching the encryption key identifier associated with the file, an encryption service module locates and encryption key in its encryption key cache using an encryption key identifier, process identifier of an application program instance, and the path to the file. An encryption key is retrieved from the encryption key cache if one is found. If an encryption key cache does not contain a matching encryption key, the encryption service module requests an encryption key from a data protection client. The encryption service module provides at least an encryption key identifier associated with the file, a path to the file, and a process identifier of the application program instance to the data protection client. If the data protection client determines the application program instance is to be trusted with the file (i.e., the data protection client allowed the application program instance to access the file recently), the data protection client returns an encryption key matching the encryption key identifier to the encryption service module. The encryption key returned by the data protection client may come from its encryption key cache, or may be obtained from an encryption key management server.

If the data protection client determines the application program instance is not to be trusted with the file, the data protection client returns an untrusted status to the encryption service module. The encryption service module treats an untrusted request as a pass-through. As a result, the read operation returns encrypted data (or raw data from the encrypted file).

If an encryption key matching the encryption key identifier is not found, a data protection client returns an error to the encryption service module. The encryption service module returns an error to the read operation. If a read error is handled by the application program instance, a user may be presented with a human readable error message indicating the application program instance has failed to read from the file.

Transparent Encryption

In an embodiment, an encryption service module intercepts a write operation of an application program instance on a file on a file system. If an encryption flag on the file is set, the encryption service module obtains an encryption key matching the encryption key identifier associated with the file to encrypt data passed in the write operation. The encrypted data is written to the file. In effect, encryption is transparent to the application program instance. The application program instance operates while unaware of the file is being encrypted, and an encryption operation is performed by the encryption service module to service its write operation.

If an encryption flag on the file is not set, the encryption service module treats the write operation as a pass-through and allows the native write operation to execute to completion. A native write operation is a write operation executed by an application program when an encryption service module is not installed.

To obtain an encryption key matching the encryption key identifier associated with the file, an encryption service module locates and encryption key in its encryption key cache using an encryption key identifier, process identifier of an application program instance, and the path to the file. An encryption key is retrieved from the encryption key cache if one is found. If an encryption key cache does not contain a matching encryption key, the encryption service module requests an encryption key from a data protection client. The encryption service module provides at least an encryption key identifier associated with the file, a path to the file, and a process identifier of the application program instance to the data protection client. If the data protection client determines the application program instance is to be trusted with the file (i.e., the data protection client allowed the application program instance to access the file recently), the data protection client returns an encryption key matching the encryption key identifier to the encryption service module. The encryption key returned by the data protection client may come from its encryption key cache, or may be obtained from an encryption key management server.

If the data protection client determines the application program instance is not to be trusted with the file, the data protection client returns an untrusted status to the encryption service module. The encryption service module treats an untrusted write operation as an error.

If an encryption key matching the encryption key identifier is not found, a data protection client returns an error to the encryption service module. The encryption service module returns an error to the write operation. If a write error is handled by the application program instance, a user may be presented with a human readable error message indicating the application program instance has failed to write to the file.

In an example, data level encryption transparency is realized with a data protection client and an encryption service module. An application program attempts to open an encrypted file, a data protection client intercepts the open operation and send the open operation along with information associated with the open operation to a policy engine. The policy engine evaluates a set of relevant policies to determine if a user is allowed to open the encrypted file. If the user is not allowed to open the encrypted file, the data protection client denies the open operation. This means the application program does not have access to unencrypted data from the encrypted file. If the user is allowed to open the encrypted file, the data protection client allows the native open operation (i.e., the code that is being run if data protection code is not installed) to run to completion. At the same time, the policy engine caches trust information associate with the open operation. The trust information includes, process identifier of the application program instance that made the file open requested, the encrypted file path and the user involved in the file open request.

After the application program instance completes the file open operation successfully, it starts reading from the encrypted file. The encryption service module intercepts read and write operations, on a first read operation, encryption service module needs to obtain a key from data protection client to decrypt file content. When encryption service module requests an encryption key from the data protection client, it provides the process identifier of the application program instance, the encrypted file path, and optionally the user information (if data protection client does not have it already). If data protection client determines the application program instance may be trusted with the encrypted file, an encryption key is returned to encryption and service module. The encryption key may be a local key or shared key. The encryption key will be used to decrypt the data requested in the read operation and subsequence I/O requests. If data protection client determines the application program instance may not be trusted with the encrypted file, no encryption key is return. The encryption service module is notified by the data protection client that the application program instance is not to be trusted. In this case, encryption service module allows the native read operation code to be executed and raw encrypted data is returned to an application program.

Throughout this process, neither the user nor the application program is aware of the encryption key request and decryption took place in the background. The data protection client and the encryption service module together archived data level encryption transparency.

Encryption Key Switching

A local encryption key (also referred to as "local key" in this document) is an encryption key available only to a first computer. Information or documents encrypted using a local key will not be accessible on a second computer because local key exist only on the first computer and it is not distributed to other computers. In order to make encrypted information or document portable, information or a document must be encrypted using a shared encryption key (also referred to as "shared key" in this document). A share key is typically generated by a encryption key management server and may be obtained by first or second computer when needed to decrypt encrypted information or document.

In an embodiment, an encryption service module performs encryption key switching (or "key switching") on encrypted information or documents. Key switching describes a process of decrypting a data encryption key (or "data key") using a first encryption key that is used to encrypt particular information or document and re-encrypting the data key with a second encryption key whereby making the particular information or document accessible only with second encryption key after the switching is completed. During the entire key switching process, the particular information or document is never decrypted. Only the data key that is used to encrypt the particular information or document is decrypted and re-encrypted.

Key switching is effective since the length of a data key is short. The computation cost to decrypt and encrypt a data key is low.

Key switching can be applied to stop sharing particular information or document. An encryption service module may facilitate switching an encryption key in the particular information or document from a shared key to a local key. Inversely, switching a local key to a shared key makes particular information or document sharable.

Key switching may be performed automatically or according to a policy.

Data-at-Rest, Data-in-Motion, and Data-in-Distribution

A data protection client protects information or documents in place (or "data-at-rest") from unauthorized access. There are situations that a data protection client cannot protect information or documents. First, when information or documents is physically removed from a computing device (e.g., removing a hard disk from a laptop computer), the information or documents that was protected by a data protection client becomes unprotected. Second, when information or documents is being sent from a first computing device to a second computing device (or "data-in-motion"), unless the transport provides end-to-end encryption, the information or documents is not protected. Third, when information or documents is sent to a recipient list via email messages, the copies of information or documents sent in email messages are no longer protected even after they arrived at their destinations (i.e., data-in-distribution).

Data-at-rest refers to information or documents stored temporary or permanently on a storage device. Examples of a storage device include volatile memory, hard disk, CD-ROM, DVD-ROM, Flash drive, Flash card, tape, and more.

Data-in-motion refers to content of information or documents being transmitted via a transport and has not reached its destination. Examples of data-in-motion include: (a) an e-mail message that is en route to a recipient's mailbox; (b) a file being transferred using file transfer protocol (or "FTP"); (c) a file or a webpage being downloaded from a Web server (e.g., using HTTP protocol); (d) a message or a file being sent using an instant messaging program; and more.

Data-in-distribution refers to information or documents being copied and copies of the information or documents reside outside the realm managed by an information management system. Examples of data-in-distribution include: (a) a file is attached to an email message and sent to a mailing list outside of an organization; (b) a file is uploaded to a public Web site; (c) a file is copied to a USB device and the USB device is removed from a computer; (d) content of a document is copied to a chat room or an instant messenger; and more.

In order to provide persistent protection to information or documents no matter the information or document is at rest, in motion or in distribution, the information or documents should be encrypted. By encrypting particular information or documents, the particular information or documents may not be accessed unless data protection client and encryption service module are available.

An encryption service module compliments a data protection client by extending information or document protection from data-at-rest under management of an information management system to all of data-at-rest, data-in-motion and data-in-distribution.

Encryption Key Management Server

In an embodiment, an encryption key management server provides a mechanism to share encryption keys used to encrypt information or documents in an information management system. An encryption key management server provides a repository for storing shared encryption keys (or "shared keys"), generates new shared keys, and provides shared keys to a data protection client. A data protection client may request a shared key by key ring identifier or key identifier. When a data protection client requests a new shared key from an encryption key management server to encrypt particular information or documents, it needs to request a shared key by key ring identifier. If the key ring identifier matches a shared key ring, the key encryption management server returns the shared key ring to the data protection client. The request is made by a key ring identifier because the data protection module does not know the key identifier of the shared key to be used to encrypt information or a document at this time (i.e., the newest key in a shared key ring is used to encrypt information or a document). To decrypt particular information or document encrypted with a shared key, a data protection client needs to provide a key identifier of the shared key in a request to an encryption key management server. If the key identifier matches a shared key in a shared key ring, the shared key ring is returned to the data protection client.

A key ring holds one or more shared keys. The newest shared key in a key ring is made the default key and an encryption service module uses the default key to encrypt data. The remaining shared keys in the key ring are used to decrypt data. Older shared keys are not used to encrypt data. An encryption key management server manages one or more key rings.

In order to support a large number of data protection clients, a key management server may be deployed using one of the following topologies: standalone, master-slave, cluster or federation.

In an implementation, an encryption key management service of a data protection client manages encryption keys on a computing device where encryption and decryption are performed. An encryption key management service manages shared key rings it obtained from an encryption key management server. It also manages a local key ring it creates. A key ring is identified by a unique key ring identifier. A shared key ring is assigned a unique key ring identifier by an encryption key management server. Whereas, a local key is assigned a predefined identifier by an encryption key management service. The encryption key management service caches a shared key ring for a period of time (e.g., one hour, one day, 3 days, one week, and more). The encryption key management service also communicates with the encryption key management server periodically to updates cached shared key rings. Encryption key management server adds new shared key to a shared key ring periodically to minimize data loss resulted from compromised encryption key. Encryption keys in a local key ring are generated by an encryption key management service. An encryption key management service also generates an encryption key periodically and places it in a local key ring.

A key ring identifier comprises any one of an integer, a string, or an object.

A key identifier comprises any one of an integer, a string, or an object.

While encryption key management on a computing device is performed by an encryption key management service of a data protection client, encryption and decryption are performed by an encryption service module. An encryption service module communicates with an encryption key management service to obtain an encryption key to be used in encrypting or decrypting information or documents. The encryption service module may perform encryption or decryption using a local key or a shared key. Only an encryption key in a key ring (not a key ring) is provided to an encryption service module by an encryption key management service.

Portable Encryption Data Format

In an embodiment, encrypted information or a document is stored in a portable encryption data format (also referred to as "PED format" in this document). A portable method means that the system retains its ability to protect information, even across different technical boundaries. Some boundaries are differences in operating systems, device types with different capabilities, or different applications. PED format consists of at least three sections: header, metadata and encrypted data. The header section contains at least an encryption key identifier (or "key identifier") and a data encryption key (or "data key"). Optionally, the header section may also contain any of an unencrypt allowed flag, a data key encryption algorithm, a data encryption algorithm, an original name, a creation time and a last modified time. The metadata section contains at least one information or document attribute (also referred to as "PED attribute"). The encrypted data section contains encrypted rendition of the unencrypted information or document.

A key identifier is a unique identifier for identifying an encryption key used to encrypt a data key stored in the header. Typically, a key identifier is generated by an encryption key management server or an encryption key management service of a data protection client. A key identifier may identify a local key or a shared key. A key identifier may be an integer, a string or an object.

A data key is an encryption key used to encrypt information or a document in the encrypted data section. It may be used encrypt PED attributes in the metadata section, optionally. A data key is typically generated by an encryption service module. While a data key is not guaranteed to be unique, data keys are generally different between two PED format files.

An unencrypt allowed flag is a directive to encryption service module indicating if the PED file should be decrypted by a policy obligation. If unencrypt allowed is set, a policy obligation may decrypt the PED file. If unencrypt allowed is not set (or is not present), a policy obligation can only perform key switching, modify PED file name to make encryption implicit or explicit, or both.

To support different encryption algorithms, a data key encryption algorithm may specify the encryption algorithm used to encrypt a data key, a data encryption algorithm may specify the encryption algorithm used to encrypt the unencrypted information or document.

Original name, creation time and last modified time are recorded in the header to facilitate transparent decryption of a file. By recording file attributes from an unencrypted file, an application program that access a PED file will be presented with unencrypted (or original) file attributes by an encryption service module. In the case where information or a document represents a file, an original name is the name of the file being encrypted. Creation time and last modified time are the corresponding file attributes of the file.

In an implementation of the portable encryption data format, original name, creation time and last modified time are stored in the metadata section.

The metadata section stores PED attributes. Examples of PED attributes include: file attributes (e.g., file owner) from unencrypted information or document, document properties (e.g., author, title or revision) from unencrypted information or document, document classification (e.g., confidential, or company secret), lineage (i.e., where does this information or document come from?) and more. PED attributes are stored as a collection of (name, value) pairs. PED attributes may be stored encrypted or unencrypted. When PED attributes are encrypted, they may be encrypted using the data key, a local key, a shared key, a metadata encryption key, or any combination thereof. An information manage system may use a common metadata encryption key to encrypt PEP attributes.

The encrypted data section contains encrypted rendition of the unencrypted information or document. Data in the encrypted data section is encrypted using a data key stored in the header. Encrypted data section may contain data encrypted using any standard-based or non-standard-based encryption algorithm.

Data in PED format may be stored in a file or transmitted in a data stream. A file in PED format is referred to as a PED file in this document. A data stream containing data in PED format is referred to as PED stream in this document.

A data protection client may access information or document attributes in metadata section of a PED file for the purpose of policy evaluation. If metadata section of a PED file is encrypted, a data protection client may request unencrypted information or document attributes from an encryption service module which has the ability to decrypt metadata.

A file tagging policy obligation may read and write metadata section of a PED file. If metadata section of a PED file is encrypted, a file tagging policy obligation may request an encryption service to read information or document attributes form, and write information or document attributes to metadata section of a PED file.

While encrypting information or a document, an encryption service module copies information or document attributes associated with unencrypted information or document to metadata section of a resulting PED file. Similarly, while decrypting a PED file, an encryption service module copies information and document attributes in metadata section of the PED file to a resulting unencrypted information or document.

Microsoft Windows and File Extension

File association is a feature in Microsoft Windows®. File association allows associating an application program to an action applied to a file of a particular type. In Microsoft Windows®, a file type is defined based on a file extension (e.g., .docx or .pdf). An action that may be applied to a file includes open, edit, explorer, print, and more. If an application program is associated with the open action of a file extension, the application program will be invoked when a user double click on a file listed on Windows Explorer®. There are other methods to open a file with a default application program with file association. For example, right click on a file on Windows Explorer® to show a context menu and select Open menu entry from the context menu. Another example is entering a file name (including file extension) into a command window (e.g., DOS Prompt®).

In Microsoft Windows® environment, file association of a PED file may be implicit or explicit. When file association is implicit, a PED file will have the same file name as the unencrypted file. As a result, the same application program that is invoked to open an unencrypted file through file association will continue to open the PED file which is a rendition of the unencrypted file. When file association is explicit, a PED file will be assigned a new file extension (e.g., .nxl). Typically, a file extension register to PED file is appended to the file name of the unencrypted file. With explicit file association, a PED file cannot be opened by the application program associated with the file extension of the unencrypted file.

In an embodiment, implicit file association is applied with encryption. By applying implicit file association, encryption is transparent to users and application programs when data protect client and encryption service module are presence.

In an example, a first file is encrypted to produce a second file. The first file is an unencrypted file with a first file name (e.g., foo.doc). The second file is a PED file with a second file name (e.g., foo.doc). To make encryption transparent to application programs used to open the second file on Microsoft Windows®, an encryption operation preserves the first file name whereby making the second file name the same as the first file name. By preserving the first file name, Microsoft Windows® file association remains unchanged on the second file.

When the second file is opened through file association (e.g., double clicking on the file on Windows Explorer), the application program associates with the second file will be launched. When the application program attempts to open the second file, a data protection client intercepts the open operation and performs policy evaluation. If a user is allowed to open the second file using the application program, the application program instance that attempts to open the second file will become trusted. When the application program instance attempts to read data from the second file, the read operation is intercepted by an encryption service module. The encryption service module communicates with the data protection client to obtain an encryption key with the key identifier in the second file. The data protection client returns an encryption key to the encryption service module because the application program instance is trusted on the second file. The encryption service module decrypt the data requested by the read operation and returns the decrypted data to complete the read operation. In the process of opening the second file with the application program, neither the user nor the application program needs to be aware of the second file being encrypted.

There is also no special action taken by the user or the application program to access the second file which is encrypted.

In an implementation, an encryption service module encrypts and decrypts file on a computing device using a local key. A file encrypted by the encryption service module is thus accessible only on the computing device.

In an implementation, an encryption service module retains the file name of a file when it encrypts a file on a computing device. The original unencrypted file is replaced with an encrypted file. The encrypted file may be opened from Windows Explorer® just like the original unencrypted file, no special user action is required.

In an implementation, an encryption service module replaces an icon associated with a PED file shown on Windows Explorer® with an icon that indicates the file is encrypted.

Figure 4:
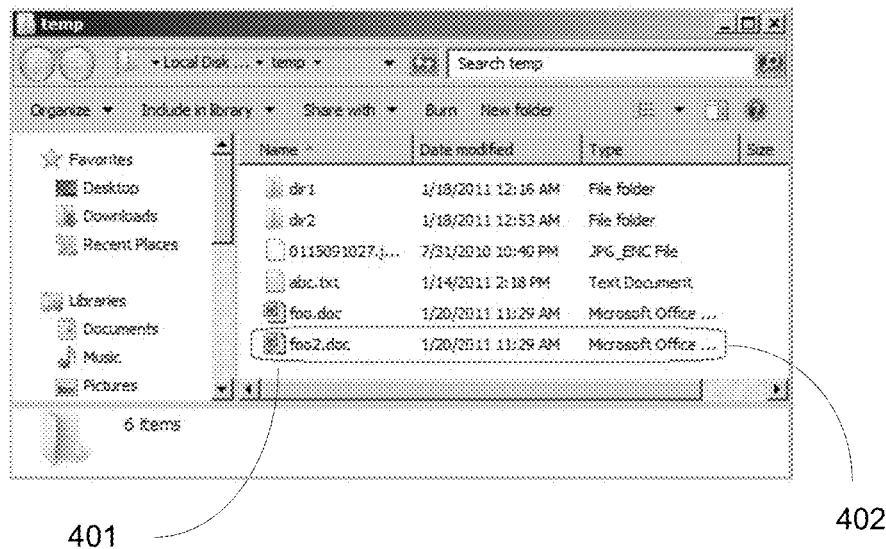
FIG. 4 shows a screen shot of a file in portable encryption data format having implicit Windows Explorer® file association.

Referring to FIG. 4, in an implementation, an encryption service module overlay an icon associated with a PED file 401 shown on Windows Explorer® with an icon that indicates the file is encrypted. The combined icon provides a visual cue illustrating both original unencrypted file type and encryption status. For example, icon 402 of file "foo2.doc" shows a document icon, used by the operating system to identify a document file. At the lower left of the icon, is overlaid a smaller icon, showing that the file is encrypted.

In an embodiment, explicit file association is applied with encryption. By applying explicit file association, a PED file may be shared with or distributed to a computer that does not have a data protection client and an encryption service module installed.

In an example, a first file is encrypted to produce a second file. The first file is an unencrypted file with a first file name (e.g., foo.doc). The second file is a PED file with a second file name (e.g., foo.doc.nxl). The second file name is constructed by appending a new file extension (e.g., .nxl for NextLabs Portable Encrypted File) to the first file name. By providing a new file extension to the second file name, Microsoft Windows® file association is not preserved.

While preserving file name when encrypting a file helps make encryption transparent on a computer that has a data protection client and an encryption service module installed. When an encrypted file with preserved file name is placed on a computer without a data protection client and an encryption service module installed, opening the encrypted file through file association will result in an error. To avoid such problem, it is advantageous to assign a special file extension to an encrypted file to denote its being a PED file.

Figure 5:
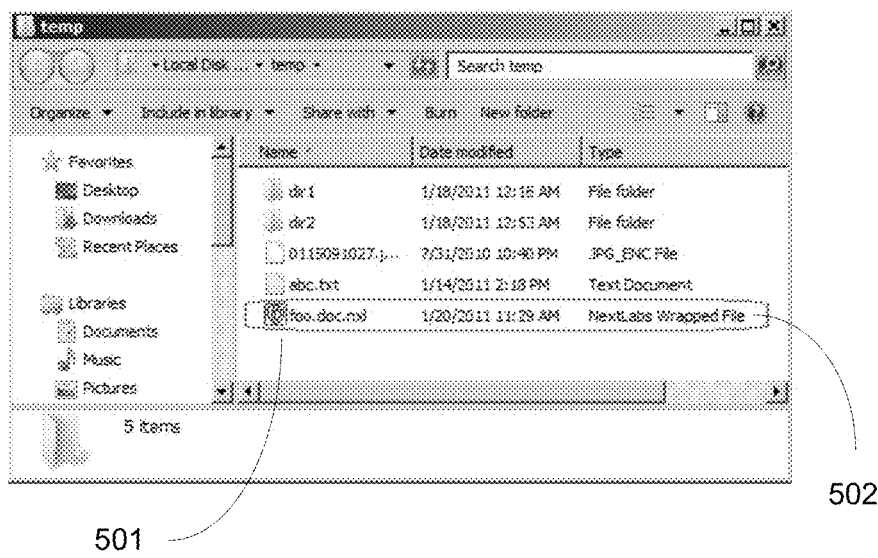
FIG. 5 shows a screen shot of a file in portable encryption data format having explicit Windows Explorer® file association.

Referring to FIG. 5, in an implementation, installing encryption service module includes registering a PED file extension (e.g., .nxl). Registering PED file extension also includes associating the file extension with a PED file icon 501 and PED file type 502.

Manual Wrapping and Unwrapping

In an embodiment, a user may encrypt or decrypt a file using a context menu on Windows Explorer®. A user may also use the context menu to switch encryption key on a PED file.

Figure 6:
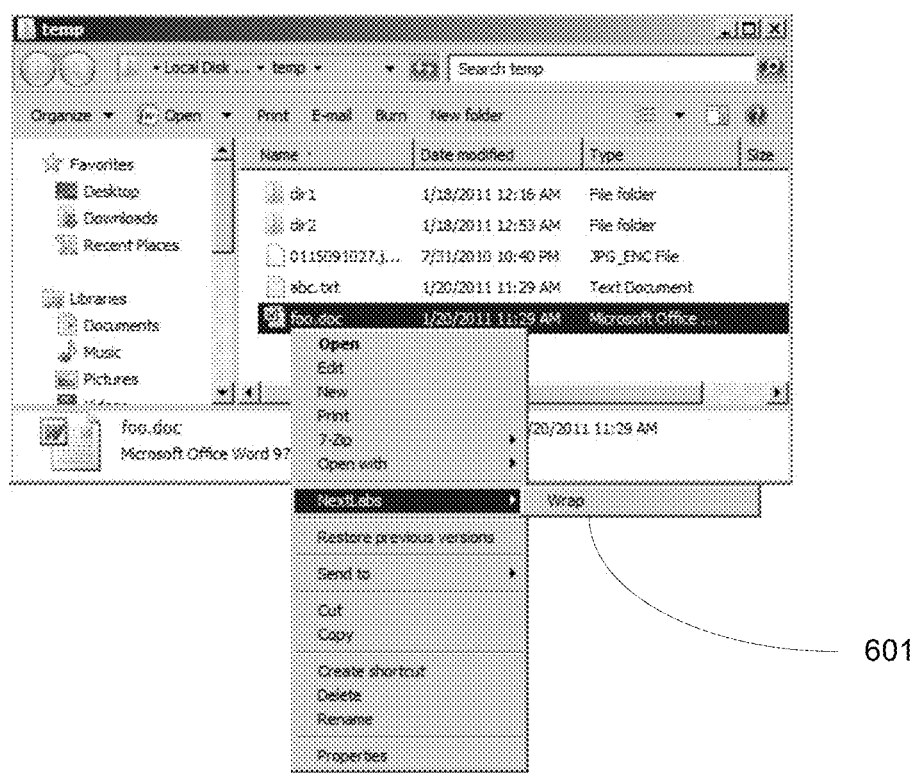
FIG. 6 shows a screenshot of a context menu entry for manually encrypting a file listed on Windows Explorer®.

Referring to FIG. 6, in an implementation, a Window Explorer® shows a context menu with an encrypt menu entry 601 designated by the "Wrap" option when a user select an unencrypted file. This context menu can be reached by using the right-click button of the user's mouse. The context menu provides additional encryption options including: (a) encrypt a file using a local key or a shared key; (b) make the resulting PED file implicit or explicit; (c) remove the file after encryption is completed; or (d) save the resulting PED file to a different location. Other implementations of the system allows a user to encrypt files using the system using other methods. For example, the system can use a dedicated icon on the Windows Explorer toolbar to encrypt files selected by the user. In another example, the user can encrypt files using the system by dragging files from the Windows Explorer to a designated area of the screen (e.g., to another icon, to an open window, or other method) to select which files to encrypt.

Figure 7:
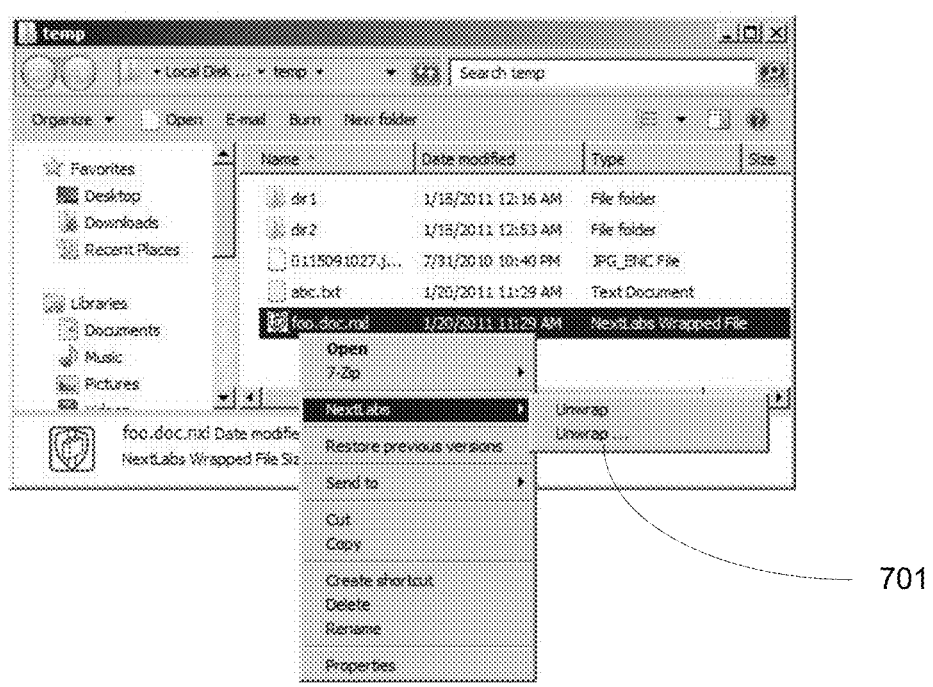
FIG. 7 shows a screenshot of a context menu entry for manually decrypting a file listed on Windows Explorer®.

Referring to FIG. 7, in an implementation, a Windows Explorer® shows a context menu with a decrypt and a sharing menu entry 701 when a user select a PED file. A user may select the decrypt menu entry to decrypt a PED file. A user may select the sharing menu entry to select an encryption key. The encryption key may be a local key or a shared key.

In an embodiment, a user may encrypt a file by copying or moving the file into a directory flagged for auto-encryption. A directory may be flagged for auto-encryption with an encryption service module. The encryption service module intercepts file operations (e.g., create file, copy file or move file) on a directory flagged for auto-encryption and encrypts a file when the file is created in the directory or after the file is written to the directory. A user may copy or move a file into a directory flagged for auto-encryption using drag-and-drop, clipboard or command line function of Microsoft Windows®.

In an implementation, to intercept file operations of a directory flagged for auto-encryption, an encryption service module may maintain a list of directory it monitors.

Auto Wrapping and Unwrapping

In an embodiment, a data protection client and an encryption service module corporate to perform automatic encryption of an unencrypted file when the unencrypted file is copied to a shared location, copied to a removable device, uploaded to a public server, or sent in an email as an attachment. Automatic encryption may be a function of a data protection client, or it may be a function of a policy (e.g., implemented by an autowrap policy obligation).

In an example, User A of design department logs on to a computer with policy enforcer and encryption service module installed. User A copies a confidential document c:\docs\foo.doc to a file server outside the design department \\inter-depart\share\john\review for User B to review. In the policy enforcer, a policy specifies that when a confidential document is copied to a file server outside the department, the confidential document will be encrypted automatically. The policy is:

```
FOR document.class=confidential
ON COPY
TO \\inter-dept\share\** OR \\public\share\**
BY user=design-department
DO ALLOW
ON ALLOW INVOKE Auto-Encrypt
```

Figure 8:
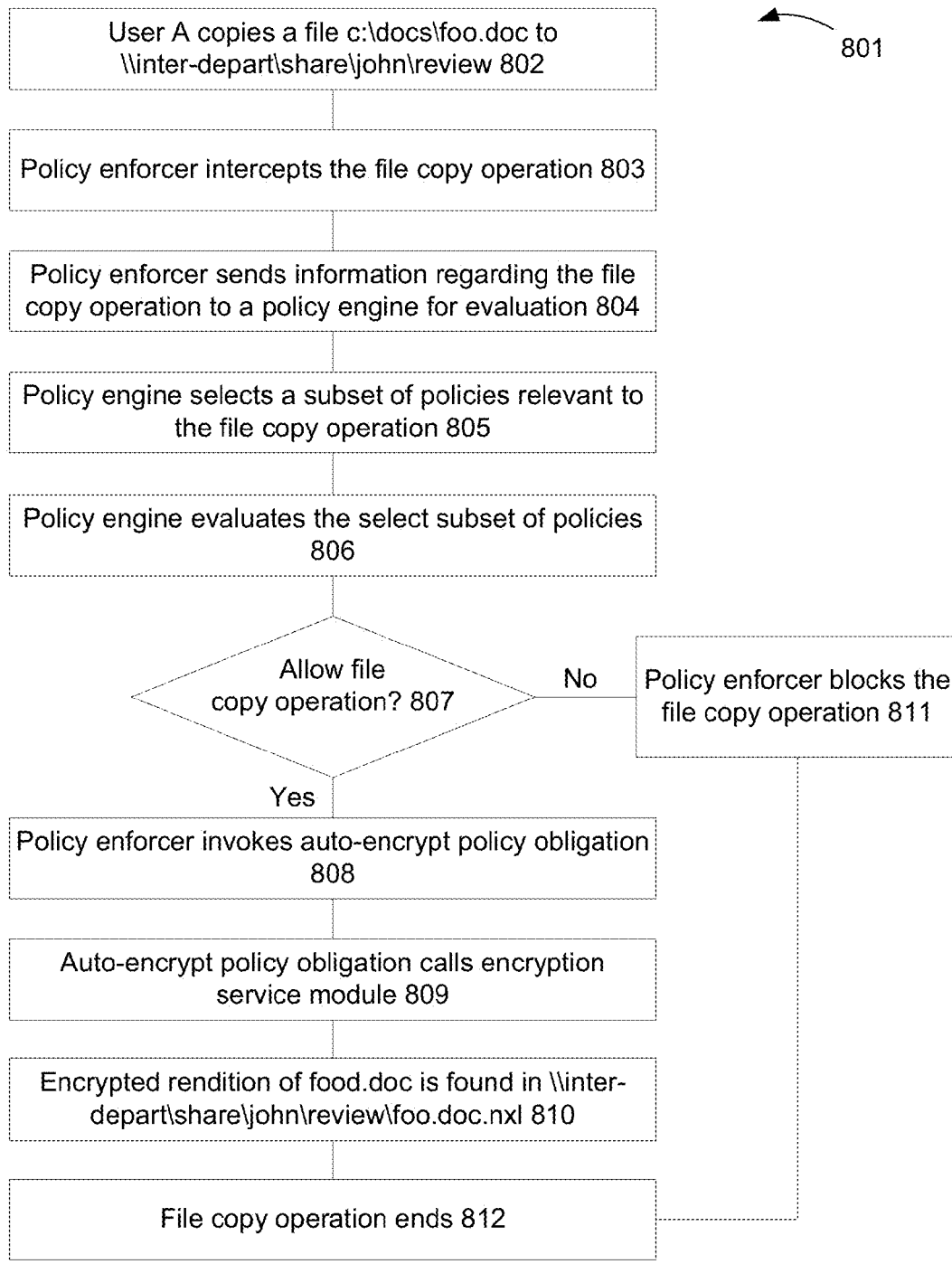
FIG. 8 shows a sample flow for automatically encrypting a file.

FIG. 8 shows a flow 801 for automatically encrypting a file using policy obligation when the file is copied to a non-department file server. In step 802, User A copies a file c:\docs\foo.doc to \\inter-depart\share\john\review. In step 803, a policy enforcer intercepts the file copy operation. In step 804, the policy enforcer sends information regarding the file copy operation to a policy engine for evaluation. In step 805, the policy engine selects a subset of policies relevant to the file copy operation which includes the above policy. In step 806, the policy engine evaluates the select subset of policies. In step 807, the policy engine determines if the file copy operation should be allowed. In step 808, the file copy operation is allowed and policy obligation is auto-encrypt. The policy enforcer invokes an auto-encrypt policy obligation with source file path (i.e., c:\docs\foo.doc) from the file copy operation and the destination file path (i.e., \\inter-depart\share\john\review\foo.doc.nxl) constructed by append .nxl file extension to destination file path of the file copy operation. In step 809, the auto-encrypt policy obligation calls encryption service module with the source and destination file path to create an encrypted file at the destination. In step 810, file copy operation is completed with an encrypted file at the destination (i.e., \\inter-depart\share\john\review\foo.doc.nxl). In step 811, file copy operation is denied. The policy enforcer blocks the file copy operation. In step 812, file copy operation ends.

In an example, a user of Company A logs on to a computer with policy enforcer and encryption service module installed. The user attaches a design drawing file to an email message and sends the email message to a recipient of Company B. A policy enforced by the policy enforcer specifies that all engineering drawing files send to a recipient outside the company will be encrypted automatically. The policy is:

```
FOR email.attach=*.dwg
ON SEND
TO *@CompanyB.com
BY user=*
DO ALLOW
ON ALLOW INVOKE Auto-Encrypt(ShareKey=SK_CompanyB)
```

Figure 9:
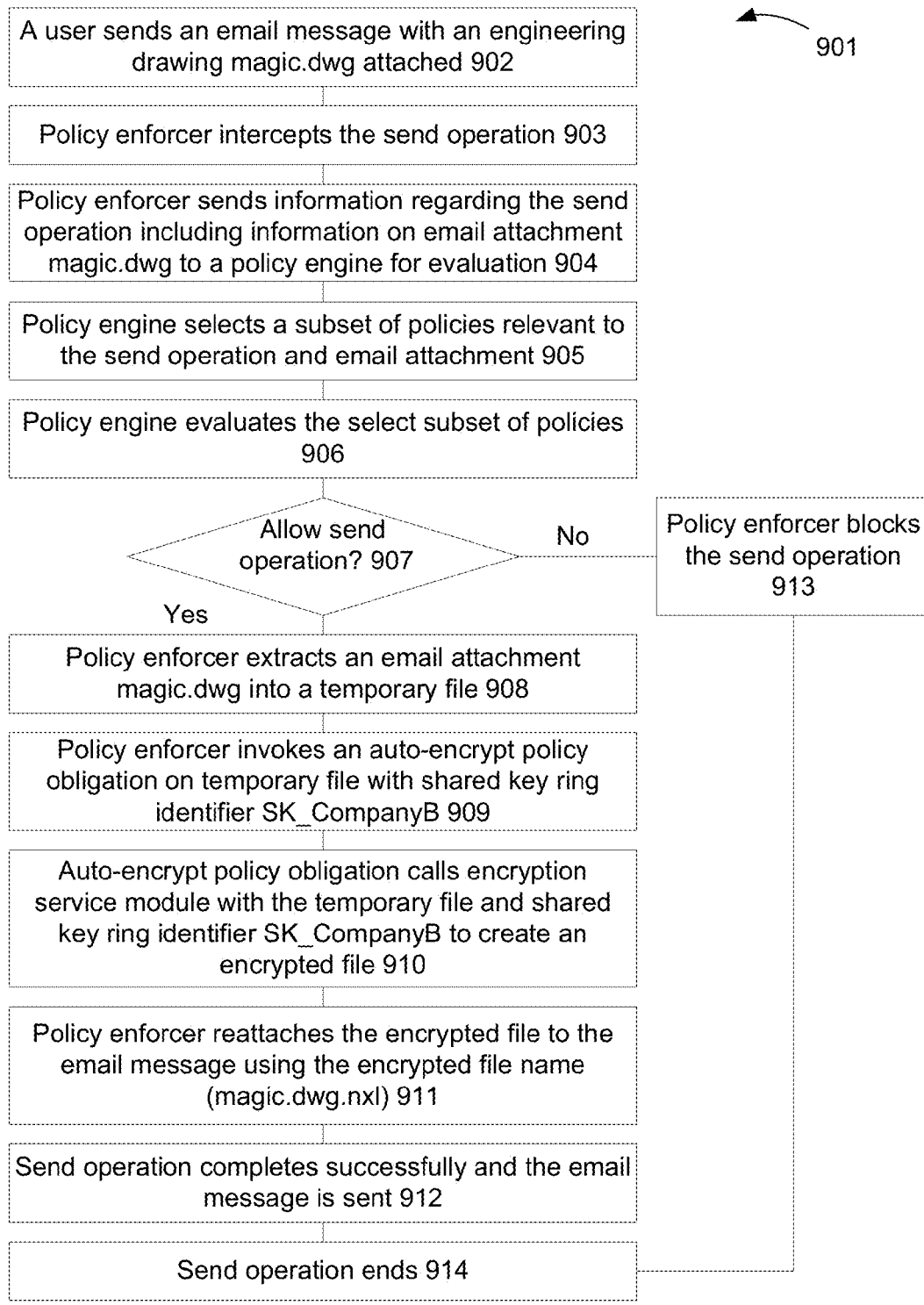
FIG. 9 shows a sample flow for encrypting an email attachment.

FIG. 9 shows a flow 901 for encrypting an email attachment with a shared key using policy obligation. In step 902, a user sends an email message with an engineering drawing magic.dwg attached. In step 903, a policy enforcer intercepts the send operation. In step 904, the policy enforcer sends information regarding the send operation including information on email attachment magic.dwg to a policy engine for evaluation. In step 905, the policy engine selects a subset of policies relevant to the send operation and email attachment which includes the above policy. In step 906, the policy engine evaluates the select subset of policies. In step 907, the policy engine determines if the send operation should be allowed. In step 908, the send operation is allowed and policy obligation is auto-encrypt. The policy enforcer extracts an email attachment magic.dwg into a temporary file. In step 909, the policy enforcer invokes an auto-encrypt policy obligation on temporary file with shared key ring identifier SK_CompanyB and constructed an encrypted file name (i.e., magic.dwg.nxl) by append .nxl file extension to the email attachment file name. In step 910, the auto-encrypt policy obligation calls encryption service module with the temporary file as source path, a destination file path and a shared key ring identifier SK_CompanyB to create an encrypted file. In step 911, the policy enforcer reattaches the encrypted file to the email message using the encrypted file name (magic.dwg.nxl). In step 912, the send operation completes successfully and the email message is sent. In step 913, the send operation is denied. The policy enforcer blocks the send operation. In step 914, the send operation ends.

In an embodiment, a data protection client and an encryption service module corporate to perform automatic key switching on a PED file when the PED file is copied to a shared location, copied to a removable device, uploaded to a public server, or sent in an email as an attachment. Automatic key switching may be a function of a data protection client, or it may be a function of a policy (e.g., implemented by an autowrap policy obligation).

In an example, a user of Company A logs on to a computer with policy enforcer and encryption service module installed.

The user attaches a production schedule spreadsheet which is encrypted with a local key to an email message and sends the email message to Customer B. A policy enforced by the policy enforcer specifies that all production documents send to a customer will be encrypted automatically. The policy is:

```
FOR email.attach.class=production
ON SEND
TO *@CustomerB.com
BY user=*
DO ALLOW
ON ALLOW INVOKE Auto-Encrypt(ShareKey=SK_CustomerB)
```

Figure 10:
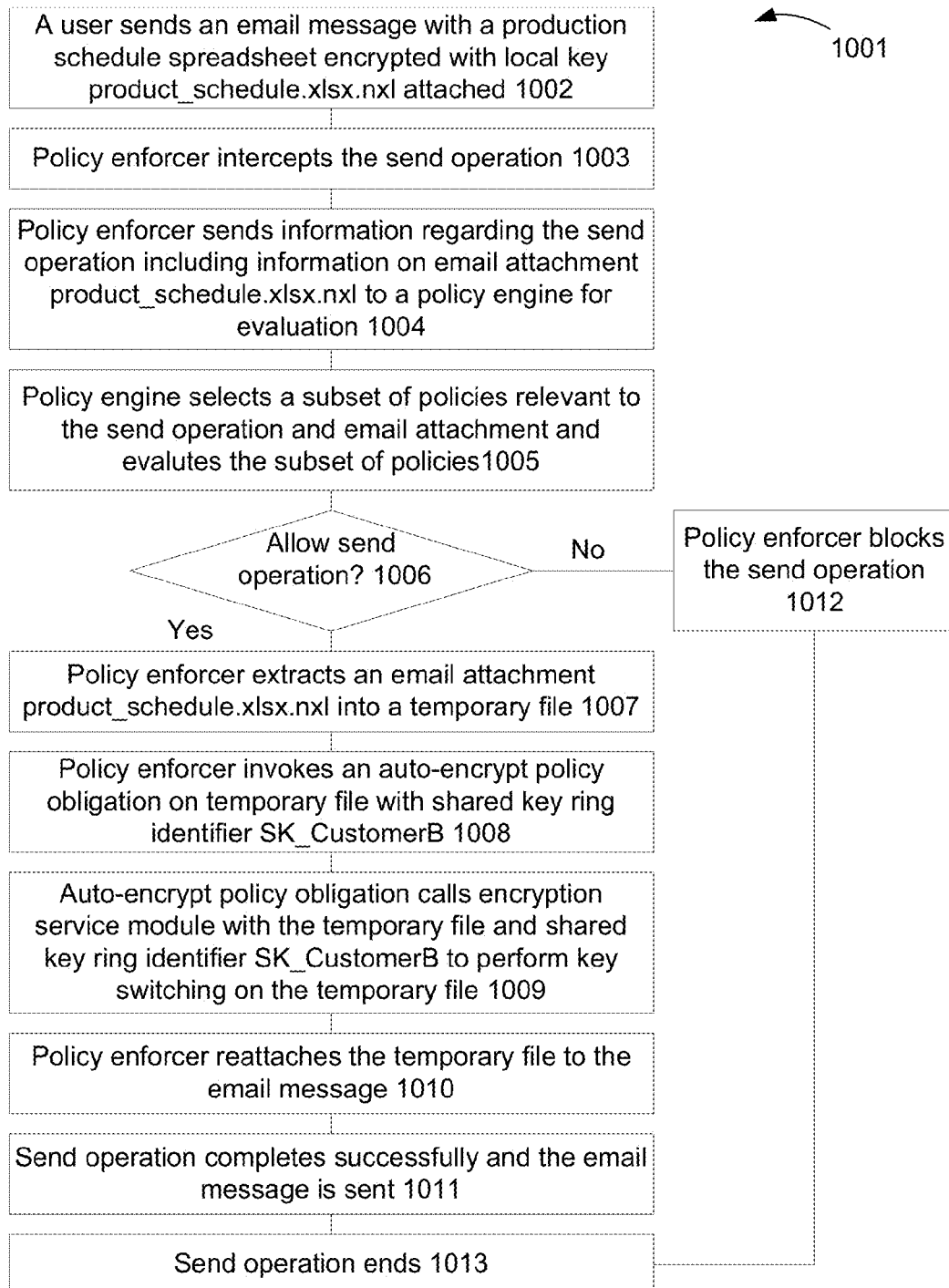
FIG. 10 shows a sample flow for switching encryption keys for e-mails.

FIG. 10 shows a flow 1001 for switching encryption keys on an email attachment to a shared key using policy obligation. In step 1002, a user sends an email message with a production schedule spreadsheet product_schedule.xlsx.nxl attached. product_schedule.xlsx.nxl is encrypted with a local key. In step 1003, a policy enforcer intercepts the send operation. In step 1004, the policy enforcer sends information regarding the send operation including information on email attachment product_schedule.xlsx.nxl to a policy engine for evaluation. In step 1005, the policy engine selects a subset of policies relevant to the send operation and email attachment which includes the above policy. The policy engine evaluates the select subset of policies. In step 1006, the policy engine determines if the send operation should be allowed. In step 1007, the send operation is allowed and policy obligation is auto-encrypt. The policy enforcer extracts an email attachment product_schedule.xlsx.nxl into a temporary file. In step 1008, the policy enforcer invokes an auto-encrypt policy obligation on temporary file with shared key ring identifier SK_CustomerB. In step 1009, the auto-encrypt policy obligation calls encryption service module with the temporary file and a shared key ring identifier SK_CustomerB to perform key switching on temporary file. In step 1010, the policy enforcer reattaches the temporary file to the email message. In step 1011, the send operation completes successfully and the email message is sent. In step 1012, the send operation is denied. The policy enforcer blocks the send operation. In step 1013, the send operation ends.

Alternatively, step 1008 may check if the temporary file is encrypted and if the temporary file is encrypted with the correct shared key. If the temporary file is already encrypted with the correct shared key, the policy enforcer does not need to call auto-encrypt policy obligation.

In an example, a user of Company A logs on to a computer with policy enforcer and encryption service module installed. The user uploads a report encrypted with a product group shared key to a customer support Web site for Customer B. A policy enforced by the policy enforcer specifies that all reports uploaded to a customer support site will be encrypted automatically. The policy is:

```
FOR document.class=report
ON UPLOAD
TO *@CustomerB.com
BY user=*
DO ALLOW
ON ALLOW INVOKE Auto-Encrypt(ShareKey=SK_CustomerB)
```

Figure 11:
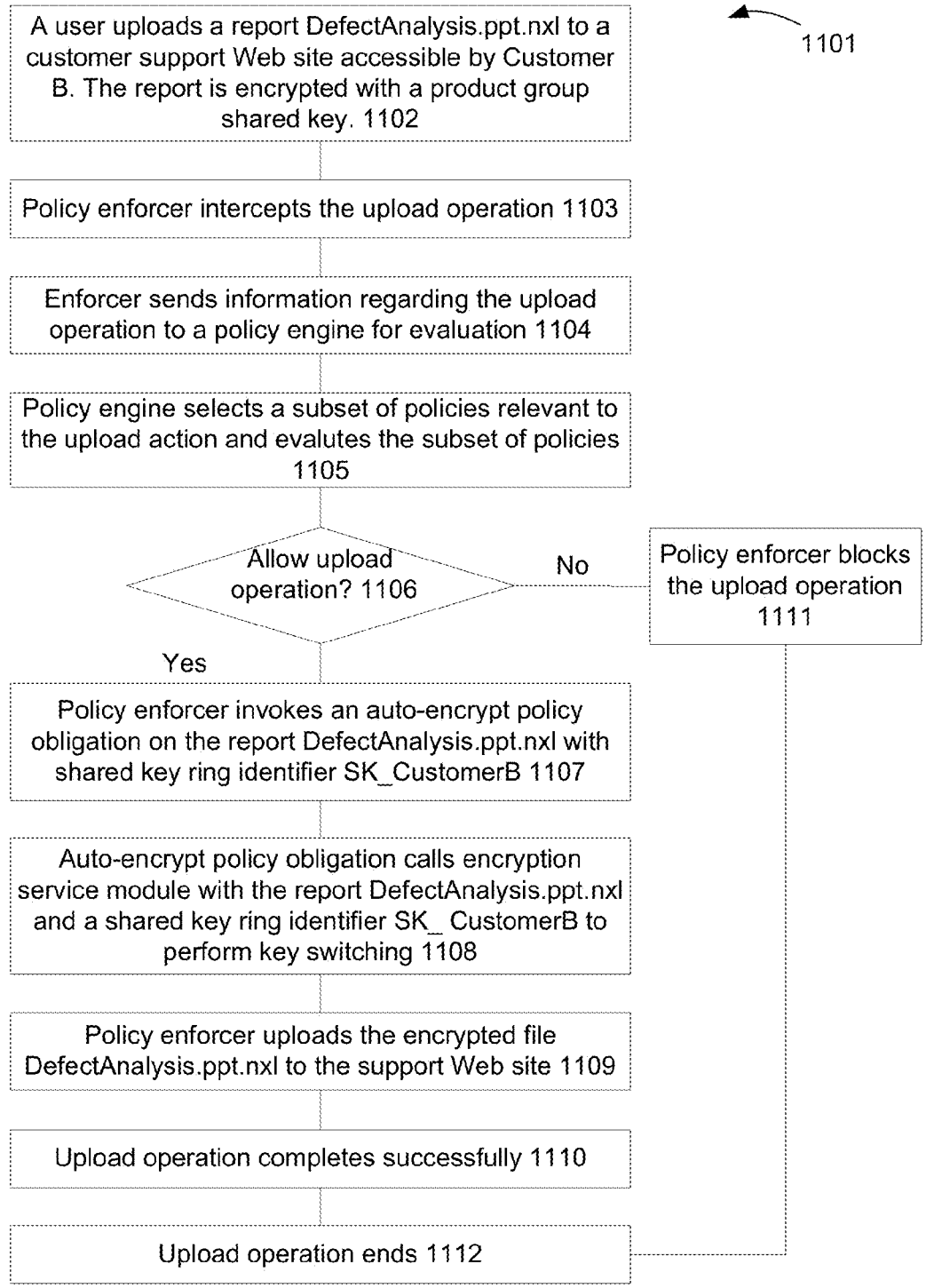
FIG. 11 shows a sample flow for switching encryption keys for file uploads.

FIG. 11 shows a flow 1101 for switching encryption keys to a shared key on file upload using policy obligation. In step 1102, a user uploads a report DefectAnalysis.ppt.nxl to a customer support Web site accessible by Customer B. The report is encrypted with a product group shared key. In step 1103, a policy enforcer intercepts the upload operation. In step 1104, the policy enforcer sends information regarding the upload operation to a policy engine for evaluation. In step 1105, the policy engine selects a subset of policies relevant to the upload operation which includes the above policy. The policy engine evaluates the select subset of policies. In step 1106, the policy engine determines if the upload operation should be allowed. In step 1107, the upload operation is allowed and policy obligation is auto-encrypt. The policy enforcer invokes an auto-encrypt policy obligation on the report DefectAnalysis.ppt.nxl with shared key ring identifier SK_CustomerB. In step 1108, the auto-encrypt policy obligation calls encryption service module with the report DefectAnalysis.ppt.nxl and a shared key ring identifier SK_CustomerB to perform key switching. In step 1109, the policy enforcer uploads the encrypted file DefectAnalysis.ppt.nxl to the support Web site. In step 1110, the upload operation completes successfully. In step 1111, the upload operation is denied. The policy enforcer blocks the upload operation. In step 1112, the upload operation ends.

Alternatively, step 1107 may check if the report is encrypted and if the report is encrypted with the correct shared key. If the report has the correct shared key, the policy enforcer does not need to call auto-encrypt policy obligation.

In an example, a policy directs a data protection client and an encryption service module to switch the encryption key of a PED file to a shared key that allows the file to be decrypted on a home computer if a PED file is copied to a removable device. The policy is:

```
FOR document.NXL_Encrypted=TRUE
ON COPY
TO [RemovableMedia]\**
DO ALLOW
ON ALLOW INVOKE Auto-Encrypt(SK_Homework)
```

In an embodiment, a data protection client automatically converts a PED file with explicit file association to a PED file with implicit file association. By making file association of a PED file implicit, a user may open a PED file the same way as the user do on an unencrypted file.

In an example, a user logs on to a computer with policy enforcer and encryption service module installed. The user opens an email message that has a PED file attachment with explicit file association (i.e., .nxl file extension). The user saves the PED file attachment to local disk and the PED file association automatically changed to implicit. A policy specifies that when a PED file with explicit file association is saved to local disk, convert file association of the PED file to implicit. The policy is:

```
FOR document=*.nxl
ON COPY
TO C:\**
BY user=*
DO ALLOW
ON ALLOW INVOKE StripFileExtension(".nxl")
```

Figure 12:
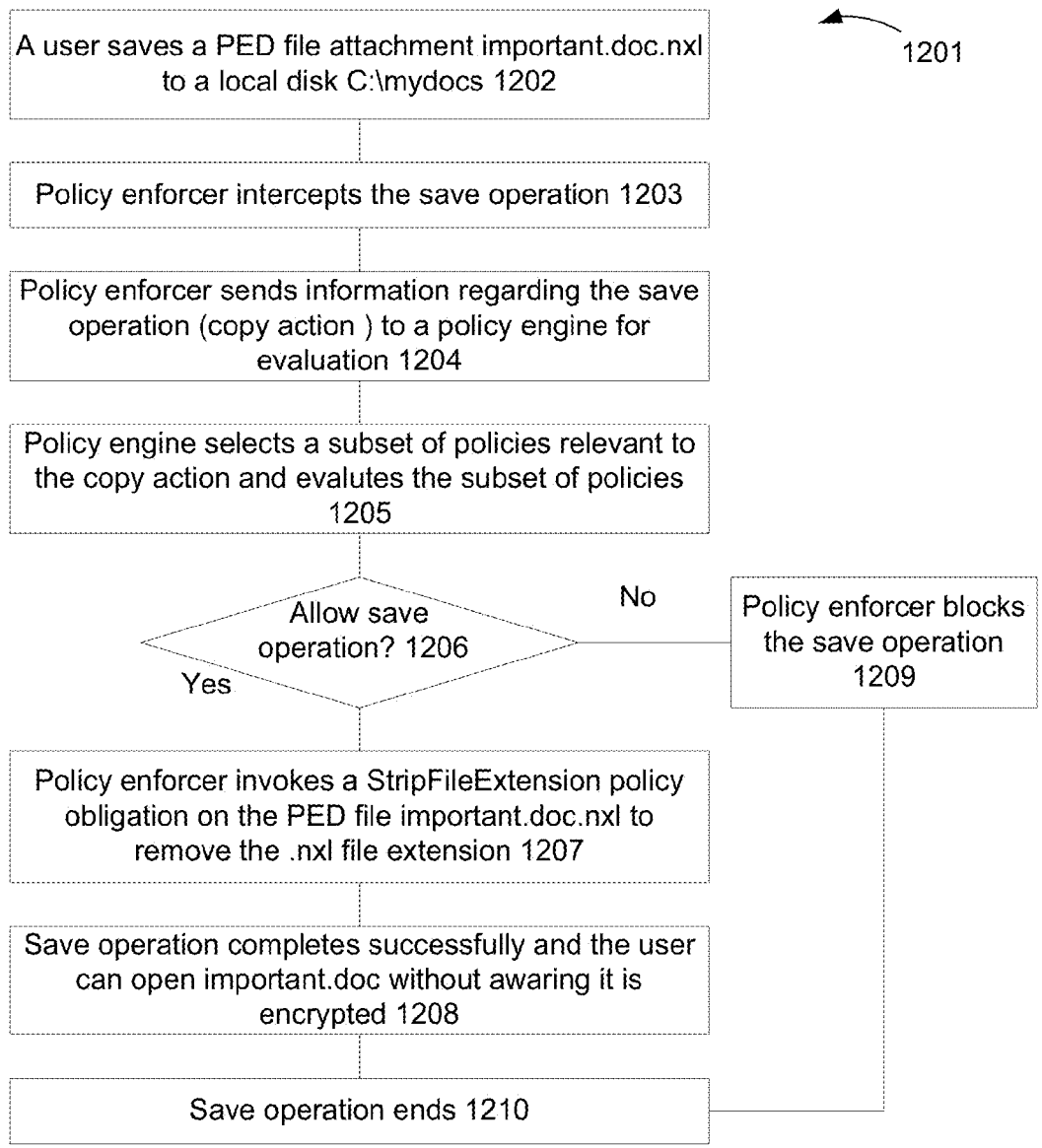
FIG. 12 shows a sample flow for converting file association using policy obligations.

FIG. 12 shows a flow 1201 for converting file association of a PED file on copy action using policy obligation. In step 1202, a user saves a PED file attachment important.doc.nxl to a local disk C:\mydocs. In step 1203, a policy enforcer intercepts the save operation (which is a copy action in policy). In step 1204, the policy enforcer sends information regarding the save operation to a policy engine for evaluation. In step 1205, the policy engine selects a subset of policies relevant to the save operation which includes the above policy. The policy engine evaluates the select subset of policies. In step 1206, the policy engine determines if the save operation should be allowed. In step 1207, the save operation is allowed and policy obligation is StripFileExtension. The policy enforcer invokes a StripFileExtension policy obligation on the PED file important.doc.nxl to remove the .nxl file extension. In step 1208, the save operation completes successfully and the user can open important.doc without awaring it is encrypted. In step 1209, the save operation is denied. The policy enforcer blocks the save operation. In step 1210, the save operation ends.

In an embodiment, a data protection client and an encryption service module corporate to decrypt a PED file according to a policy.

In an example, a user logs on to a computer with policy enforcer and encryption service module installed. The user downloads a manufacturing schedule spreadsheet encrypted with a product group shared key on an inter-department Web site to a local disk. A policy specifies that all reports downloaded to a customer support site will be encrypted automatically. The policy is:

```
FOR document=http://inter-dept/manufacturing/schedule/**/*.nxl
ON DOWNLOAD
TO C:\**
BY user=product-group
DO ALLOW
ON ALLOW INVOKE Decrypt
```

Figure 13:
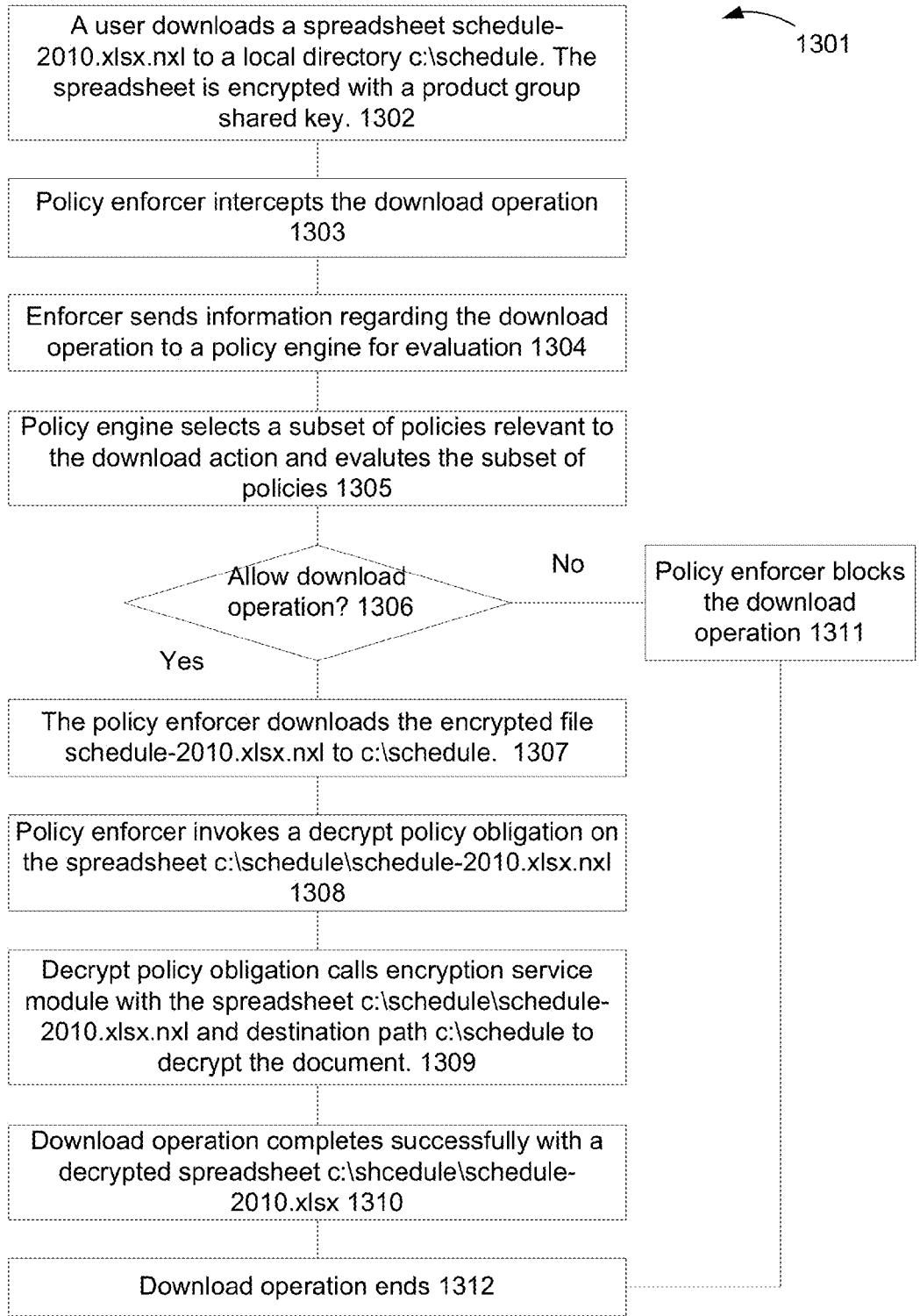
FIG. 13 shows a sample flow for automatically decrypting a file using policy obligation.

FIG. 13 shows a flow 1301 for automatically decrypting a file using policy obligation. In step 1302, a user downloads a spreadsheet schedule-2010.xlsx.nxl to a local directory c:\schedule. The spreadsheet is encrypted with a product group shared key. In step 1303, a policy enforcer intercepts the download operation. In step 1304, the policy enforcer sends information regarding the download operation to a policy engine for evaluation. In step 1305, the policy engine selects a subset of policies relevant to the download operation which includes the above policy. The policy engine evaluates the select subset of policies. In step 1306, the policy engine determines if the download operation should be allowed. In step 1307, the download operation is allowed and policy obligation is decrypt. The policy enforcer downloads the encrypted file schedule-2010.xlsx.nxl to c:\schedule. In step 1308, the policy enforcer invokes a decrypt policy obligation on the spreadsheet c:\schedule\schedule-2010.xlsx.nxl. In step 1309, the decrypt policy obligation calls encryption service module with the spreadsheet c:\schedule\schedule-2010.xlsx.nxl and destination path c:\schedule to decrypt the document. In step 1310, the download operation completes successfully with a decrypted spreadsheet c:\shcedule\schedule-2010.xlsx. In step 1311, the download operation is denied. The policy enforcer blocks the download operation. In step 1312, the download operation ends.

Alternatively, step 1307 may check if the report is encrypted and if the report is encrypted with the correct shared key. If the report has the correct shared key, the policy enforcer does not need to call auto-encrypt policy obligation.

In an embodiment, a data protection client automatically converts a PED file with explicit file association to a PED file with implicit file association. By making file association of a PED file implicit, a user may open a PED file the same way as the user do on an unencrypted file.

In an embodiment, a PED file provides a unified means to collect information or document attributes (or "metadata") from differ sources to enable consistent policy enforcement on information or a document across different operating systems, file systems, document repository or document archive, and whether information or a document is at rest, in motion or in distribution. A PED file contains a metadata section to store attributes associated with particular information or document. When a file is encrypted, the metadata section of a PED file may hold file system attributes, file system extended attributes, document properties, or document repository attributes. In an implementation, while the actual contents in a document file is prevented from being viewed (e.g., what is actually written in the document) because it is encrypted, metadata associated with the document file is accessible (e.g., the title of the document, when the document was last edited).

For an unencrypted document, attributes may be stored in different locations. Some attributes are stored within a document. Some attributes are stored with the document on a file system. And some attributes are stored in a document repository with a document.

Examples of attributes stored within a document include: 1) document properties of a Microsoft Word® document, Microsoft Excel® document, or Microsoft PowerPoint® document; 2) file properties of an Adobe PDF® file; 3) MIME header of an email message; 4) HyperText Transfer Protocol (or "HTTP") header of a Simple Object Access Protocol (or "SOAP") message; 5) HyperText Markup Language (or "HTML") header; or more.

Examples of attributes associated with a document on a file system include: 1) standard file attributes (e.g., file name, last modified time or owner); 2) extended file system attributes on UNIX® and LINUX® file systems; 3) data in alternative file stream on Microsoft NTFS® file system; 4) data in resource fork on Apple OS/X®; and more.

Examples of attributes stored with a document in a document repository include: 1) document attributes stored with a document on a document management server (e.g., Microsoft SharePoint® or Documentum®); 2) document attributes stored with a document on an Enterprise Resource Planning (or "ERP") system (e.g., SAP); 3) file attributes associated with a file on a source code control system (e.g., Subversion or Perforce); and more.

When a PED file is decrypted, the information or document attributes in the metadata section may be stored as document properties in a document, or extended file system attributes on a file system.

By having information or document attributes stored in a PED file, data protection clients may enforce polices consistently across different operating systems.

An advantage of a PED file is it provides a portable means to transport information or a document of different types. A PED file is operating system, file system and file type agnostic. A PED file may be encrypted or decrypted on any operating system, stored on any file system, and encapsulate information or document of any format.

In an example of the portable encryption, User B is an end user at Company X. User B is working on Company Y account and has access to proprietary customer information (i.e., information proprietary to Company Y). The following is an example flow of an implementation: (i) User B logs into her computer; (ii) User B brings up her email account and create a new email message addressed to her colleague at Company X, User C; (iii) User B attaches a file that is encrypted with a shared key and stored locally on her computer to the email message, and sends the email message with the encrypted file attached to User C; (iv) User C has a data protection client and an encryption service module installed on his system; (v) User C receives the email message and is able to read the encrypted file without taking any special action (i.e., the decryption process is invisible to him); (vi) After a few months and several new encryption keys have come and gone (new encryption keys are generated periodically to limit damage due to key lost), User C sends the encrypted file to User D of Company X; (vii) User D opens the encrypted file and is able to read it without delay or having to perform any special action; and (viii) end of example flow.

To protected information or document in an organization, a policy author may develop policies that prevent a user from copying unencrypted information or documents to locations that may be accessed by a user who is not a member of the organization.

In one example, a policy may be written based on resource attributes of information or document such that unencrypted information or document with an resource attribute indicating the information or document is confidential is not allowed to be copied to an external facing SharePoint site of a company. The policy is:

```
FOR document.class=confidential AND
    document.NXL_Encrypted=FALSE
ON COPY
TO http://sharepoint.mycompany.com/site/external/**
BY *
DO DENY
```

In another example, a policy may be written to apply encryption to unencrypted information or document via a policy obligation when the unencrypted information or document is about to be copied to a location that may not be protected by an information management system.

In this case, a data protection client intercepts an operation that may cause unencrypted information or document to leave the protective realm of an information management system. To protect the unencrypted information or document, a policy applies an auto-encrypt policy obligation on the unencrypted information or document. On evaluating policies relevant to the intercepted operation, the policy engine determined an auto-encrypt policy obligation needs to be invoked. The data protection client invokes auto-encrypt policy obligation to encrypt the destination copy of the information or document.

Some examples of operations that may allow unencrypted information or document to leave the protective realm of an information management system include: copying unencrypted information or document to a USB drive; attaching an unencrypted file to an email message addressed to a recipient outside an organization; uploading an unencrypted file to an online site outside an organization; and more.

```
FOR document.NXL_Encrypted=FALSE
ON COPY
TO [RemovableMedia]\** OR
    http://sharepoint.mycompany.com/site/external/**
BY *
DO DENY
```

In an embodiment, an encryption key access control is built on a trust system, wherein trust is established as a result access control decisions performed by a data protection client. Trust is established on the basis of: (a) a process of an application program instance (or application program process) making a request; (b) the encrypted information or document (or resource) being accessed; and (c) the user requesting access to the encrypted information or document. If access control decision has been made to allow access to the information or document by the application program process and by the user recently, trust has been established. If an encryption key request from an encryption service module satisfies the trust requirement, a data protection client provides the encryption key to the encryption service module. And the encryption service module will apply the encryption key only to requests from the application program process on the information or document.

This encryption key access control mechanism is managed by a data protection client. Encryption key management on a computing device is thus part of a data protection client, integrated with access control and decoupled from encryption service module. Since encryption key access control is another form of access control, it integrates naturally with a data protection client.

In an embodiment, combining a data protection client and an encryption service module provides application program independent access and use control on information or documents, encryption key management and persistent data protection on a computing device. While application program instrumentation provides data protection in a heterogeneous environment that consists of varying application programs, operating systems and computing devices. The information or documents being managed may be accessed from many different sources.

For example, the type of computing devices that may be used to access information or documents in an organization includes: desktop computers, laptop computers, file servers, ERP systems, smart phones, tablet computers, and more. These devices may be running different operating systems including: Microsoft Windows®, Linux®, UNIX®, Apple OS/X®, Android®, and more.

With a data protection client-based key management service, an encryption key can be securely managed by a data protection client on a computing device and made available to an encryption service on the computing device independent of the operating system running on the computing device.

In another implementation, a method makes encrypted information or documents portable where encrypted information or documents may be accessed on different computing devices. The portable encryption technique described in this document provides a means to convert information or a document encrypted using a local key to a shared key so that the information or document may become accessible to other users. The transformation from local key to shared key may be carried out without user intervention.

In another implementation, a method provides a transparent encryption means to allow automatic opening of a PED file with a default application program through Microsoft Windows® file association function. For example, the default application for a .docx file on Microsoft Windows® is typically Microsoft Word®.

In another implementation, a method provides an attribute-based policy system where information or document access and use control may be enforced according to user attribute, document attribute, or a combination thereof.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a document management system managing a plurality of documents wherein the document management system comprises clients and servers;
at a first client, executing a first policy enforcer program;
at the first client, trapping by the first policy enforcer program a request by an e-mail application to send an e-mail with a document attachment, managed by the document management system, to a second client;
at the first policy enforcer program, evaluating at least one policy associated with the document attachment;
as a result of the evaluating, determining that the send request is allowed, but before allowing to e-mail application to send the document attachment, encrypting the document attachment;
allowing the e-mail application to send the encrypted document attachment to the second client;
sending a notification from a second policy enforcer regarding an attempt at the second client to open the encrypted document;
determining that the encrypted document is encrypted;
with the second policy enforcer program, requesting a key that will allow decryption of the encrypted document; and
using the key to unencrypt the encrypted document attachment and obtaining the unencrypted document attachment.

2. The method of claim 1 comprising:
sending a notification from a second policy enforcer regarding an attempt at the second client to open the encrypted document;
determining the attempt at the second client is not allowed according to a first policy;
at the second client, disallowing the second client from opening the encrypted document.

3. The method of claim 1 wherein the document attachment is unencrypted.

4. The method of claim 1 wherein the at least one policy associated with document attachment is stored at the first client.

5. The method of claim 1 wherein the document attachment is encrypted by an encryption module executing on the first client, the encryption module is separate from the policy enforcer program.

6. A method comprising:
providing a document management system managing a plurality of documents wherein the document management system comprises clients and servers;
at a first client, executing a first policy enforcer program;
at the first client, trapping by the first policy enforcer program a request by an e-mail application to send an e-mail with a document attachment, managed by the document management system, to a second client;
at the first policy enforcer program, evaluating at least one policy associated with the document attachment;
as a result of the evaluating, determining that the send request is allowed, but before allowing the e-mail application to send the document attachment, encrypting the document attachment;
allowing the e-mail application to send the encrypted document attachment to the second client;
receiving the encrypted document attachment at the second client;
detecting an attempt to open the encrypted document attachment at the second client at a second policy enforcer program at the second client;
at the second policy enforcer program, evaluating at least one policy associated with encrypted document attachment;
as a result of the evaluating, determining that the open operation is allowed;
at an encryption module executing on the second client, determining the encrypted document attachment is encrypted; and
at the encryption module, attempting to obtain a key for the encrypted document attachment by sending a key request to the second policy enforcer program including information comprising a process identifier.

7. The method of claim 6 comprising:
at the second policy enforcer program, receiving the key request from the encryption module and evaluating the request based on the information comprising a process identifier; and
when the process identifier matches a previously saved process identifier, at the second policy enforcer program, sending a request to a key server of the document management system.

8. The method of claim 6 comprising:
after receiving a key at the second client, passing the key to the encryption module; and
at the encryption module, using the received key in unencrypting of the encrypted document attachment to obtain the unencrypted document attachment.

9. The method of claim 6 wherein the at the first policy enforcer program, evaluating at least one policy associated with the document attachment comprises selecting the at least one policy from a plurality of policies.

10. The method of claim 6 wherein the key for the encrypted document attachment is a shared key.

11. The method of claim 6 wherein the encrypting the document attachment comprises:
accessing a shared encryption key ring at the first policy enforcer program, wherein the first shared key ring is accessible to the second policy enforcer program;
selecting a first encryption key of the shared encryption key ring; and
encrypting the document attachment with the first encryption key.

12. The method of claim 11 wherein the shared encryption key ring is stored at a key management server.

13. The method of claim 12 wherein the evaluated at least one policy at the second policy enforcer program comprises a key ring identifier.

14. The method of claim 13 wherein the at least one policy at the first client is stored separately from the key management server.

15. The method of claim 6 wherein the at least one policy at the second client comprises an encryption key identifier.

16. The method of claim 6 wherein the determining that the send request is allowed, but before allowing the e-mail application to send the document attachment, encrypting the document attachment further comprises:
removing the document attachment from the e-mail; and
attaching the encrypted document attachment to the e-mail.

17. The method of claim 16 wherein the attaching the encrypted document attachment to the e-mail comprises attaching with the first policy enforcer program.

18. The method of claim 6 wherein the at least one policy evaluated at the second policy enforcer is different than the at least one policy evaluated at the first policy enforcer.

19. The method of claim 6 wherein the document attachment is associated with a first file extension and the encrypted document attachment is associated with a second document extension, different than the first document extension.

20. The method of claim 6 further comprising:
as a result of the evaluating, determining that the send request is denied; and
when the send request is denied, preventing the send request by the first policy enforcer program.

\* \* \* \* \*